(12) United States Patent
Dubrow et al.

(10) Patent No.: US 8,025,960 B2
(45) Date of Patent: *Sep. 27, 2011

(54) POROUS SUBSTRATES, ARTICLES, SYSTEMS AND COMPOSITIONS COMPRISING NANOFIBERS AND METHODS OF THEIR USE AND PRODUCTION

(75) Inventors: Robert S. Dubrow, San Carlos, CA (US); Chunming Niu, Palo Alto, CA (US)

(73) Assignee: Nanosys, Inc., Palo Alto, CA (US)

( * ) Notice: Subject to any disclaimer, the term of this patent is extended or adjusted under 35 U.S.C. 154(b) by 899 days.

This patent is subject to a terminal disclaimer.

(21) Appl. No.: 10/941,746

(22) Filed: Sep. 15, 2004

(65) Prior Publication Data

US 2007/0190880 A1  Aug. 16, 2007

Related U.S. Application Data

(60) Provisional application No. 60/541,463, filed on Feb. 2, 2004.

(51) Int. Cl.
*A61F 13/00* (2006.01)
*B32B 3/26* (2006.01)
*A61M 35/00* (2006.01)

(52) U.S. Cl. .......... 428/304.4; 428/309.9; 424/443; 424/445; 604/289; 604/309

(58) Field of Classification Search ........ 442/2, 43, 442/44, 46, 49; 977/961; 602/41–47; 427/2.31; 424/443, 445; 428/304.4, 309.9; 604/289; 604/304

See application file for complete search history.

(56) References Cited

U.S. PATENT DOCUMENTS

| 3,651,030 | A | * | 3/1972 | Desaulniers et al ....... 428/315.7 |
| 4,859,338 | A | * | 8/1989 | Behr ............................ 210/490 |
| 5,196,396 | A | | 3/1993 | Lieber et al. |
| 5,226,913 | A | * | 7/1993 | Pinchuk ..................... 140/71 R |
| 5,252,835 | A | | 10/1993 | Lieber et al. |
| 5,274,602 | A | | 12/1993 | Glenn et al. |
| 5,332,910 | A | | 7/1994 | Haraguchi et al. |
| 5,338,430 | A | | 8/1994 | Parsonage et al. |
| 5,505,928 | A | | 4/1996 | Alivisatos et al. |
| 5,512,131 | A | | 4/1996 | Kumar et al. |
| 5,640,343 | A | | 6/1997 | Gallagher et al. |
| 5,674,592 | A | | 10/1997 | Clark et al. |
| 5,690,807 | A | | 11/1997 | Clark, Jr. et al. |

(Continued)

FOREIGN PATENT DOCUMENTS

JP  S63-286327  11/1988

(Continued)

OTHER PUBLICATIONS

Sappenfield, Mark, "Spider-Man's sticky power in human reach", Christian Science Monitor, Jun. 5, 2003.*

(Continued)

*Primary Examiner* — D. Lawrence Tarazano
*Assistant Examiner* — Matthew D Matzek
(74) *Attorney, Agent, or Firm* — Donna M. Fabian; Andrew L. Filler

(57) ABSTRACT

Porous nanofiber bearing substrate materials are provided having enhanced surface area for a variety of applications including as electrical substrates, semipermeable membranes and barriers, structural lattices for tissue culturing and for composite materials, and the like.

17 Claims, 11 Drawing Sheets

U.S. PATENT DOCUMENTS

| | | |
|---|---|---|
| 5,751,018 A | 5/1998 | Alivisatos et al. |
| 5,800,706 A * | 9/1998 | Fischer ................. 210/198.2 |
| 5,814,031 A * | 9/1998 | Mooney et al. ............ 604/307 |
| 5,840,435 A | 11/1998 | Lieber et al. |
| 5,858,862 A | 1/1999 | Westwater et al. |
| 5,897,945 A | 4/1999 | Lieber et al. |
| 5,953,595 A | 9/1999 | Gosain et al. |
| 5,962,863 A | 10/1999 | Russell et al. |
| 5,976,957 A | 11/1999 | Westwater et al. |
| 5,990,479 A | 11/1999 | Weiss et al. |
| 5,997,832 A | 12/1999 | Lieber et al. |
| 6,004,444 A | 12/1999 | Aksay et al. |
| 6,036,774 A | 3/2000 | Lieber et al. |
| 6,048,616 A | 4/2000 | Gallagher et al. |
| 6,106,913 A | 8/2000 | Scardino et al. |
| 6,128,214 A | 10/2000 | Kuekes et al. |
| 6,130,143 A | 10/2000 | Westwater et al. |
| 6,136,156 A | 10/2000 | El-Shall et al. |
| 6,159,742 A | 12/2000 | Lieber et al. |
| 6,190,634 B1 | 2/2001 | Lieber et al. |
| 6,207,229 B1 | 3/2001 | Bawendi et al. |
| 6,225,198 B1 | 5/2001 | Alivisatos et al. |
| 6,235,675 B1 | 5/2001 | McIlroy |
| 6,248,674 B1 | 6/2001 | Kamins et al. |
| 6,256,767 B1 | 7/2001 | Kuekes et al. |
| 6,265,333 B1 | 7/2001 | Dzenis et al. |
| 6,268,041 B1 | 7/2001 | Goldstein |
| 6,270,347 B1 | 8/2001 | Webster et al. |
| 6,274,007 B1 | 8/2001 | Smirnov et al. |
| 6,286,226 B1 | 9/2001 | Jin |
| 6,306,736 B1 | 10/2001 | Alivisatos et al. |
| 6,313,015 B1 | 11/2001 | Lee et al. |
| 6,321,915 B1 * | 11/2001 | Wilson et al. ............ 210/505 |
| 6,322,895 B1 | 11/2001 | Canham |
| 6,322,901 B1 | 11/2001 | Bawendi et al. |
| 6,359,288 B1 | 3/2002 | Ying et al. |
| 6,380,103 B2 | 4/2002 | Gonzalez et al. |
| 6,383,923 B1 | 5/2002 | Brown et al. |
| 6,413,489 B1 | 7/2002 | Ying et al. |
| 6,438,025 B1 | 8/2002 | Skarupo |
| 6,447,663 B1 | 9/2002 | Lee et al. |
| 6,471,761 B2 | 10/2002 | Fan et al. |
| 6,495,258 B1 * | 12/2002 | Chen et al. ............... 428/408 |
| 6,566,704 B2 | 5/2003 | Choi et al. |
| 6,586,785 B2 | 7/2003 | Flagan et al. |
| 6,666,214 B2 | 12/2003 | Canham |
| 6,667,099 B1 | 12/2003 | Greiner et al. |
| 6,669,256 B2 | 12/2003 | Nakayama et al. |
| 6,670,179 B1 | 12/2003 | Mattson et al. |
| 6,689,166 B2 | 2/2004 | Laurencin et al. |
| 6,720,240 B2 | 4/2004 | Gole et al. |
| 6,737,160 B1 | 5/2004 | Full et al. |
| 6,743,408 B2 | 6/2004 | Lieber et al. |
| 6,760,245 B2 | 7/2004 | Eaton et al. |
| 6,773,616 B1 | 8/2004 | Chen et al. |
| 6,781,166 B2 | 8/2004 | Lieber et al. |
| 6,798,000 B2 | 9/2004 | Luyken et al. |
| 6,808,535 B1 | 10/2004 | Jordan |
| 6,815,218 B1 | 11/2004 | Jacobson et al. |
| 6,815,750 B1 | 11/2004 | Kamins |
| 6,831,017 B1 | 12/2004 | Li et al. |
| 6,858,455 B2 | 2/2005 | Guillom et al. |
| 6,872,439 B2 | 3/2005 | Fearing et al. |
| 6,872,645 B2 | 3/2005 | Duan et al. |
| 6,878,871 B2 | 4/2005 | Scher et al. |
| 6,882,051 B2 | 4/2005 | Majumdar et al. |
| 6,962,823 B2 | 11/2005 | Empedocles et al. |
| 7,051,945 B2 | 5/2006 | Stumbo et al. |
| 7,056,409 B2 | 6/2006 | Dubrow |
| 7,057,881 B2 | 6/2006 | Chow et al. |
| 7,067,328 B2 | 6/2006 | Dubrow et al. |
| 7,074,294 B2 | 7/2006 | Dubrow |
| 7,132,161 B2 | 11/2006 | Knowles et al. |
| 7,181,811 B1 | 2/2007 | Tomanek et al. |
| 7,285,422 B1 * | 10/2007 | Little et al. ............... 436/180 |
| 2001/0023986 A1 | 9/2001 | Mancevski |
| 2001/0051367 A1 * | 12/2001 | Kiang .................. 435/182 |
| 2002/0014667 A1 * | 2/2002 | Shin et al. ............... 257/368 |
| 2002/0037383 A1 | 3/2002 | Spillman et al. |
| 2002/0049495 A1 | 4/2002 | Kutryk et al. |
| 2002/0061662 A1 | 5/2002 | Boggild |
| 2002/0090542 A1 * | 7/2002 | Mosdale et al. ............ 429/35 |
| 2002/0090725 A1 | 7/2002 | Simpson et al. |
| 2002/0117659 A1 | 8/2002 | Lieber et al. |
| 2002/0125192 A1 | 9/2002 | Lopez et al. |
| 2002/0127495 A1 | 9/2002 | Scherer |
| 2002/0130311 A1 | 9/2002 | Lieber et al. |
| 2002/0130353 A1 | 9/2002 | Lieber et al. |
| 2002/0158342 A1 | 10/2002 | Tuominen et al. |
| 2002/0163079 A1 | 11/2002 | Awano |
| 2002/0167118 A1 | 11/2002 | Billiet et al. |
| 2002/0172963 A1 | 11/2002 | Kelley et al. |
| 2002/0175408 A1 | 11/2002 | Majumdar et al. |
| 2002/0179434 A1 | 12/2002 | Dai et al. |
| 2003/0012723 A1 | 1/2003 | Clarke |
| 2003/0032892 A1 | 2/2003 | Erlach et al. |
| 2003/0042562 A1 | 3/2003 | Giebeler et al. |
| 2003/0044777 A1 | 3/2003 | Beattie |
| 2003/0059742 A1 | 3/2003 | Webster et al. |
| 2003/0065355 A1 | 4/2003 | Weber |
| 2003/0071246 A1 | 4/2003 | Grigorov |
| 2003/0089899 A1 | 5/2003 | Lieber et al. |
| 2003/0093107 A1 | 5/2003 | Parsonage et al. |
| 2003/0124312 A1 | 7/2003 | Autumn |
| 2003/0180472 A1 | 9/2003 | Zhou et al. |
| 2003/0184357 A1 * | 10/2003 | Dijon et al. ............... 327/301 |
| 2003/0185741 A1 | 10/2003 | Matyjaszewski et al. |
| 2003/0186522 A1 | 10/2003 | Duan et al. |
| 2003/0189202 A1 | 10/2003 | Li et al. |
| 2003/0195611 A1 | 10/2003 | Greenhalgh et al. |
| 2003/0200521 A1 * | 10/2003 | DeHon et al. ............... 716/16 |
| 2003/0208888 A1 | 11/2003 | Fearing et al. |
| 2003/0229393 A1 | 12/2003 | Kutryk et al. |
| 2003/0232721 A1 | 12/2003 | Zhou et al. |
| 2004/0005258 A1 | 1/2004 | Fonash et al. |
| 2004/0005454 A1 | 1/2004 | Full et al. |
| 2004/0009598 A1 | 1/2004 | Hench et al. |
| 2004/0012118 A1 | 1/2004 | Perez et al. |
| 2004/0023317 A1 | 2/2004 | Motamedi et al. |
| 2004/0026684 A1 | 2/2004 | Empedocles |
| 2004/0031975 A1 | 2/2004 | Kern et al. |
| 2004/0036126 A1 | 2/2004 | Chau et al. |
| 2004/0036128 A1 | 2/2004 | Zhang et al. |
| 2004/0052867 A1 | 3/2004 | Canham |
| 2004/0061422 A1 | 4/2004 | Avouris et al. |
| 2004/0071870 A1 * | 4/2004 | Knowles et al. ............ 427/200 |
| 2004/0076681 A1 | 4/2004 | Dennis et al. |
| 2004/0079278 A1 | 4/2004 | Kamins |
| 2004/0095658 A1 | 5/2004 | Buretea et al. |
| 2004/0098023 A1 | 5/2004 | Lee et al. |
| 2004/0106203 A1 | 6/2004 | Stasiak et al. |
| 2004/0112964 A1 | 6/2004 | Empedocles et al. |
| 2004/0115239 A1 | 6/2004 | Shastri et al. |
| 2004/0118448 A1 | 6/2004 | Scher et al. |
| 2004/0121681 A1 | 6/2004 | Lindsay et al. |
| 2004/0135951 A1 | 7/2004 | Stumbo et al. |
| 2004/0146560 A1 | 7/2004 | Whiteford et al. |
| 2004/0202703 A1 * | 10/2004 | Meyer-Ingold et al. ...... 424/445 |
| 2004/0206448 A1 | 10/2004 | Dubrow |
| 2004/0244677 A1 | 12/2004 | Takami |
| 2004/0250950 A1 | 12/2004 | Dubrow et al. |
| 2005/0011431 A1 | 1/2005 | Samuelson et al. |
| 2005/0017171 A1 | 1/2005 | Samuelson et al. |
| 2005/0026526 A1 * | 2/2005 | Verdegan et al. ............ 442/340 |
| 2005/0038498 A1 | 2/2005 | Dubrow et al. |
| 2005/0048859 A1 | 3/2005 | Canham et al. |
| 2005/0064618 A1 | 3/2005 | Brown et al. |
| 2005/0066883 A1 | 3/2005 | Dubrow et al. |
| 2005/0072509 A1 | 4/2005 | Full et al. |
| 2005/0079659 A1 | 4/2005 | Duan et al. |
| 2005/0096509 A1 | 5/2005 | Olson |
| 2005/0110064 A1 | 5/2005 | Duan et al. |
| 2005/0118494 A1 | 6/2005 | Choi |
| 2005/0148984 A1 | 7/2005 | Lindsay et al. |
| 2005/0181195 A1 | 8/2005 | Dubrow |
| 2005/0181587 A1 | 8/2005 | Duan et al. |
| 2005/0187605 A1 * | 8/2005 | Greenhalgh et al. ......... 623/1.15 |

| | | | |
|---|---|---|---|
| 2005/0219788 A1 | 10/2005 | Chow et al. | |
| 2005/0221072 A1 | 10/2005 | Dubrow et al. | |
| 2005/0245637 A1 | 11/2005 | Hossainy et al. | |
| 2005/0260355 A1 | 11/2005 | Weber et al. | |
| 2005/0279274 A1 | 12/2005 | Niu et al. | |
| 2006/0054936 A1 | 3/2006 | Lieber et al. | |
| 2006/0159916 A1 | 7/2006 | Dubrow et al. | |
| 2006/0188774 A1 | 8/2006 | Niu et al. | |
| 2007/0084797 A1* | 4/2007 | Cooper et al. | 210/660 |

FOREIGN PATENT DOCUMENTS

| | | |
|---|---|---|
| JP | 2001-288626 | 10/2001 |
| JP | 2001-288626 A1 | 10/2001 |
| JP | 2003-239171 | 8/2003 |
| WO | WO 96/29629 A2 | 9/1996 |
| WO | WO 99/18893 A1 | 4/1999 |
| WO | WO 99/40812 A1 | 8/1999 |
| WO | WO 9940812 A1 * | 8/1999 |
| WO | 0108781 | 2/2001 |
| WO | WO 01/08781 A2 | 2/2001 |
| WO | WO 01/49776 A2 | 7/2001 |
| WO | WO 02/17362 A2 | 2/2002 |
| WO | WO 02/080280 A1 | 10/2002 |
| WO | WO 03/085701 A2 | 10/2003 |
| WO | WO 03/095190 A1 | 11/2003 |
| WO | WO 03/097702 A2 | 11/2003 |
| WO | WO 03/099951 A2 | 12/2003 |
| WO | WO 03/102099 A1 | 12/2003 |
| WO | WO-2005023923 | 3/2005 |

OTHER PUBLICATIONS

Google and Google Scholar searches Oct. 6, 2009.*
Bachtold, A. et al., "Logic Circuits with Carbon Nanotube Transistors" *Science* (2001) 294:1317-1320.
Bjork, M.T. et al. "One-dimensional steeplechase for electrons realized" *Nano Letters* (2002) 2:86-90.
Cao, Y. et al. "Growth and properties of semiconductor core/shell nanocrystals with InAs cores" *J. Am. Chem. Soc.* (2000) 122:9692-9702.
Chen, J. et al., "Observation of a Large On-Off Ratio and Negative Differential Resistance in an Electronic Molecular Switch" *Science* (1999) 286:1550-1552.
Chung, S-W. et al., "Silicon Nanowire Devices" *App. Phys. Letts. (2000)* 76(15):2068-2070.
Collier, C.P. et al., "Electronically Configurable Molecular-Based Logic Gates" *Science* (1999) 285:391-394.
Cui, Y. et al. "Doping and electrical transport in silicon nanowires" *J. Phys. Chem. B* (2000) 104:5213-5216.
Cui, Y. et al. "Diameter-controlled synthesis of single-crystal silicon nanowires" *Appl. Phys. Lett.* (2001) 78:2214-2216.
Cui, Y. et al., "Functional Nanoscale electronic devices assembled using silicon nanowire building blocks" *Science* (2001) 291:851-853.
Dabbousi, B.O. et al. "(CdSe)ZnS core-shell quantum dots: Synthesis and characterization of a size series of highly luminescent nanocrystallites" *J. Phys. Chem. B.* (1997) 101:9463-9475.
Derycke, V. et al., "Carbon Nanotube Inter-and Intramolecular Logic Gates" *Nano Letters* (2001) 1(9):453-456.
Duan, X. et al., "General synthesis of compund semiconductor nanowires" *Adv. Mater.* (2000) 12:298-302.
Duan, X. et al., "High performance thin-film transistors using semiconductor nanowires and nanoribbons" *Nature* (2003) 425:274-278.
Givargizov, E.I. "Fundamental Aspects of VLS Growth" *J. Cryst. Growth* (1975) 31:20-30.
Greene, L. et al. "Low-temperatuer wafer scale production of ZnO nanowire arrays", *Angew. Chem. Int. Ed.* (2003) 42:3031-3034.
Gudiksen, M.S. et al. "Diameter-selective synthesis of semiconductor nanowires" *J. Am. Chem. Soc.* (2000) 122:8801-8802.
Gudiksen, M.S. et al. "Synthetic control of the diameter and length of single crystal semiconductor nanowires" *J. Phys. Chem. B* (2001) 105:4062-4064.
Gudiksen, M.S. et al. "Growth of nanowire superlattice structures for nanoscale photonics and electronics" *Nature* (2002) 415:617-620.

Haraguchi, K. et al., "Polarization Dependence of Ligh Emitted from GaAs p-n junctions in quantum wire crystals" *J. Appl. Phys.* (1994) 75(8):4220-4225.
Haraguchi, K. et al., "Self Organized Fabrication of Planar GaAs Nanowhisker Arrays" *Appl. Phys. Lett.* (1996) 69(3):386-387.
Hiruma, K. et al., "GaAs Free Standing Quantum Sized Wires" *J. Appl. Phys.* (1993) 74(5):3162-3171.
Huang, Y. et al., "Directed Assembly of One-Dimensional Nanostructures into Functional networks" *Science* (2001) 291:630-633.
Huang, Y. et al., "Logic Gates and Computation from Assembed Nanowire Building Blocks" *Science* (2001) 294:1313-1317.
Jun, Y-W. et al. "Controlled synthesis of multi-armed CdS nanorod architectures using monosurfactant system" *J. Am. Chem. Soc.* (2001) 123:5150-5151.
Kong, J. et al., "Synthesis of individual single-walled carbon nanotubes on patterned silicon wafers" *Nature* (1998) 395:878-881.
Kong, J. et al., "Chemical vapor deposition of methane for single-walled carbon nanotubes" *Chem. Phys. Lett.* (1998) 292:567-574.
Kong, J. et al., "Nanotube molecular wires as chemical sensors" *Science* (2000) 287:622-625.
Liu, C. et al. "Sol-Gel Synthesis of Free-Standing Ferroelectric Lead Zirconate Titanate Nanoparticles" *J. Am. Chem. Soc.* (2001) 123:4344-4345.
Manalis, S.F. et al., "Microvolume field-effect pH sensor for the scanning probe microscope" *Applied Phys. Lett.* (2000) 76:1072-1074.
Manna, L. et al. "Synthesis of Soluble and Processable Rod-, Arrow-, Teardrop-, and Tetrapod-Shaped CdSe Nanocrystals" *J. Am. Chem. Soc.* (2000) 122:12700-12706.
Manna, L. et al. "Epitaxial growth and photochemical annealing of graded CdS/ZnS shells on colloidal CdSe nanorods" *J. Am. Chem. Soc.* (2002) 124:7136-7145.
Martin, C.R., "Nanomaterials: A membrane-based synthetic approach" Science 266:1961-1966.
Morales, A.M. et al. "A laser ablation method for the synthesis of crystalline semiconductor nanowires" *Science* (1998) 279:208-211.
Peng, X et al. "Epitaxial growth of highly luminescent CdSe/CdS core/shell nanocrystals with photostability and electronic accessibility" *J. Am. Chem. Soc.* (1997) 119:7019-7029.
Peng, X. et al. "Shape Control of CdSe Nanocrystals" *Nature* (2000) 404:59-61.
Rabin, O. et al., "Formation of thick porous anodic alumina films and nanowire arrays on silicon wafers and glass" *Adv. Func. Mater.* (2003) 13(8):631-638.
Puntes, V.F. et al. "Colloidal nanocrystal shape and size control: The case of cobalt" *Science* (2001) 291:2115-2117.
Schon J.H. et al., "Field-effect modulation of the conductance of single molecules" *Science* (2001) 294:2138-2140.
Schon, J.H. et al., "Self-assembled monolayer organic field-effect transistors"(2001) *Nature* 413:713-716.
Service, R.F., "Assembling nanocircuits from the bottom up" *Science* (2001) 293:782-785.
Tang, T. et al., "Synthesis of InN Nanowires Using a Two-Zone Chemical Vapor Deposition Approach" IEEE (Aug. 14, 2003) 205-207.
Tans, S.J. et al., "Room-temperature transistor based on a single carbon nanotube" *Nature* (1998) 393:49-52.
Thess, A. et al., "Crystalline ropes of metallic carbon nanotubes"(1996) *Science* 273:483-486.
Tseng, G.Y. et al., "Toward nanocomputers" (2001) *Science* 294:1293-1294.
Urban, J.J. et al. "Synthesis of single-crystalline perovskite nanowires composed of barium titanate and strontium titanate" *J. Am. Chem. Soc.* (2002) 124(7):1186-1187.
Wagner, R.S. et al., "Vapor-Liquid-Solid mechanism of single crystal growth" *Appl. Phys. Lett.* (1964) 4(5):89-90.
Wang, D. et al., "Low Temperature Synthesis of Single-Crystal Germanium Nanowires by Chemical Vapor Deposition" *Angew. Chem. Int. Ed.* (2002) 41(24):4783-4786.
Wu, Y et al. "Block-by-block growth of single-crystalline Si/SiGe superlattice nanowires" *Letters* (2002) 2(2):83-86.

Yamada, T. "Analysis of submicron carbon nanotube field-effect transistors" *Appl. Phys. Letts.* (2000) 76(5):628-630.

Yazawa, M. et al. "Semiconductor nanowhiskers" *Adv. Mater.* (1993) 5(7/8):577-580.

Yun, W.S. et al. "Ferroelectric Properties of Individual Barium Titanate Nanowires Investigated by Scanned Probe Microscopy" *Nanoletters* (2002) 2(5):447-450.

Zhou, C. et al., "Nanoscale metal/self-assembled monolayer/metal heterostructures" *Applied Phys. Lett* (1997) 71:611-613.

"Stain-resistant pants are so 'last week'; try the odor-free socks," Small Times, Oct. 3, 2003.

Autumn, K. et al., "Adhesive force of a single gecko foot-hair" Nature (2000) 405:681-685.

Chen, I.W. et al., "Sintering dense nanocrystalline ceramics without final-stage grain growth" Nature (2000) 404(6774):168-171.

Choi, H. et al., "Surface-modified silica colloid for diagnostic imaging" J. Colloid Interface Sci (2003) 258(2):435-437.

Cui et al., "Nanowire nanosensors for highly sensitive and selective detection of biological and chemical species" Science (2001) 293:1289-1292.

Davis, D.H. et al., "Immobilization of RGD to <111> silicon surfaces for enhanced cell adhesion and proliferation" Biomaterials (2002) 23:4019-4027.

Duan, X. et al., "Single-nanowire electrically driven lasers" Nature (2003) 421:241-245.

Geim, A.K. et al., "Microfabricated adhesive mimicking gecko foot-hair" Nature Materials (2003) 2:461-463.

Hanekamp C. et al., "Randomized comparison of balloon angioplasty versus silicon carbon-coated stent implantation for de novo lesions in small coronary arteries" Am. J. Cardiol. (2004) 93(10):1233-1237.

Huang et al., "Integrated optoelectronics assembled from semiconductor nanowires" Abstracts of Papers of the ACS, 224:U308, (Aug. 18-22, 2002) Boston, MA.

Price, R.L. et al., "Nanometer surface roughness increases select osteoblast adhesion on carbon nanofiber compacts" J. Biomed. Mat. Res. (2004) 70A(1):129-138.

Shastri, V.P., "Non-degradable biocompatible polymers in medicine: past, present and future" Curr Pharm. Biotechnol. (2003) 4(5):331-337.

Silva, G.A. et al., "Selective differentiation of neural progenitor cells by high-epitope density nanfibers" Science (2004) 303:1352-1355.

Webster, T.J. et al., "Nano-biotechnology: carbon nanofibres as improved neural and orthopaedic implants" Nanotechnology (2004) 15:48-54.

Webster, T.J. et al., "Increased osteoblast adhesion on nanophase metals: Ti, Ti6A14V, and CoCrMo" Biomaterials (2004) 25:4731-4739.

Xu, H. et al., "Room-temperature preparation and characterization of poly(ethylene glycol)-coated silica nanoparticles for biomedical applications" J. Biomed. Mat. Res. (2003) 66A(4):870-879.

Xu, H. et al., "Strong and bioactive composites containing nano-silica-fused whiskers for bone repair" Biomaterials (2004) 25:4615-4626.

Zhou, X.T. et al., "Silicon nanowires as chemical sensors" Chemical Physics Letters (2003) 369(1-2):220-224.

Li, W-N. et al. "Synthesis and Characterization of Silicon Nanowires on Mesophase Carbon Microbead Substrates by Chemical Vapor Deposition" J. Phys. Chem. B (2005) 109:3291-3297.

\* cited by examiner

POROUS SUBSTRATES, ARTICLES, SYSTEMS AND COMPOSITIONS COMPRISING NANOFIBERS AND METHODS OF THEIR USE AND PRODUCTION

CROSS REFERENCE TO RELATED APPLICATIONS

This application claims priority to provisional U.S. Patent Application Ser. No. 60/541,463, filed Feb. 2, 2004, the full disclosure of which is hereby incorporated by reference in its entirety for all purposes.

BACKGROUND OF THE INVENTION

Nanotechnology has been simultaneously heralded as the next technological evolution that will pave the way for the next societal evolution, and lambasted as merely the latest batch of snake oil peddled by the technically overzealous. Fundamentally both sides of the argument have a number of valid points to support their position. For example, it is absolutely clear that nanomaterials possess very unique and highly desirable properties in terms of their chemical, structural and electrical capabilities. However, it is also clear that, to date, there is very little technology available for integrating nanoscale materials into the macroscale world in a reasonable commercial fashion and/or how to assemble these nanomaterials into more complex systems for the more complex prospective applications, e.g., nanocomputers, nanoscale machines, etc. A variety of researchers have proposed a number of different ways to address the integration and assembly questions by waiving their hands and speaking of molecular self assembly, electromagnetic assembly techniques and the like. However, there has been either little published success or little published effort in these areas.

In certain cases, uses of nanomaterials have been proposed that exploit the unique and interesting properties of these materials more as a bulk material than as individual elements requiring individual assembly. For example, Duan et al., Nature 425:274-278 (September 2003), describes a nanowire based transistor for use in large area electronic substrates, e.g., for displays, antennas, etc., that employs a bulk processed, oriented semiconductor nanowire film or layer in place of a rigid semiconductor wafer. The result is an electronic substrate that performs on par with a single crystal wafer substrate, but that is manufacturable using conventional and less expensive processes that are used in the poorer performing amorphous semiconductor processes. In accordance with this technology, the only new process requirement is the ability to provide a film of nanowires that are substantially oriented along a given axis. The technology for such orientation has already been described in detail in, e.g., International Patent Application Nos. PCT/US03/09827, PCT/US03/09991, both filed Apr. 1, 2003, and PCT/US03/30637, filed Sep. 30, 2003, as well as U.S. patent application Ser. No. 10/673,092, filed Sep. 25, 2003, (the full disclosures of each of which are hereby incorporated by reference herein, in their entirety for all purposes) and is readily scalable to manufacturing processes.

In another exemplary case, bulk processed nanocrystals have been described for use as a flexible and efficient active layer for photoelectric devices. In particular, the ability to provide a quantum confined semiconductor crystal in a hole conducting matrix (to provide type-II bandgap offset), allows the production of a photoactive layer that can be exploited either as a photovoltaic device or photoelectric detector. When disposed in an active composite, these nanomaterials are simply processed using standard film coating processes that are available in the industry. See, e.g., U.S. patent application Ser. No. 10/656,802, filed Sep. 4, 2003, and incorporated herein by reference in its entirety for all purposes.

In accordance with the expectation that the near term value of nanotechnology requires the use of these materials in more of a bulk or bulk-like process, the present invention uses nanomaterials not as nanomaterials per se, but as a modification to larger materials, compositions and articles to yield fundamentally novel and valuable materials compositions and articles.

BRIEF SUMMARY OF THE INVENTION

The present invention is directed, in general, to a novel presentation of nanomaterials that enables a broader use and application of those materials while imparting ease of handling, fabrication, and integration that is lacking in previously reported nanomaterials. In particular, the present invention provides a porous substrate upon which is attached a plurality of nanofibers. The nanofibers may be attached to any portion or over the entire overall surface of the substrate or may be localized primarily or substantially upon the interior wall surfaces of the apertures that define the pores that are disposed through the porous substrate.

The articles of the invention may be employed as filtration media to filter gas, fluids or the like, or they may be employed as semipermeable barriers, e.g., breathable moisture barriers for outerwear, bandages, or the like. The articles of the invention may also be employed to integrate nanomaterials into electronic devices, in which the nanomaterials impart useful characteristics, e.g., as electrodes and or other active elements in photovoltaic devices and the like, or they may be used to integrate these nanomaterials into physical structures, e.g., composites, or biological structures, e.g., tissue.

DETAILED DESCRIPTION

I. General Description of the Invention

Figure 1A:
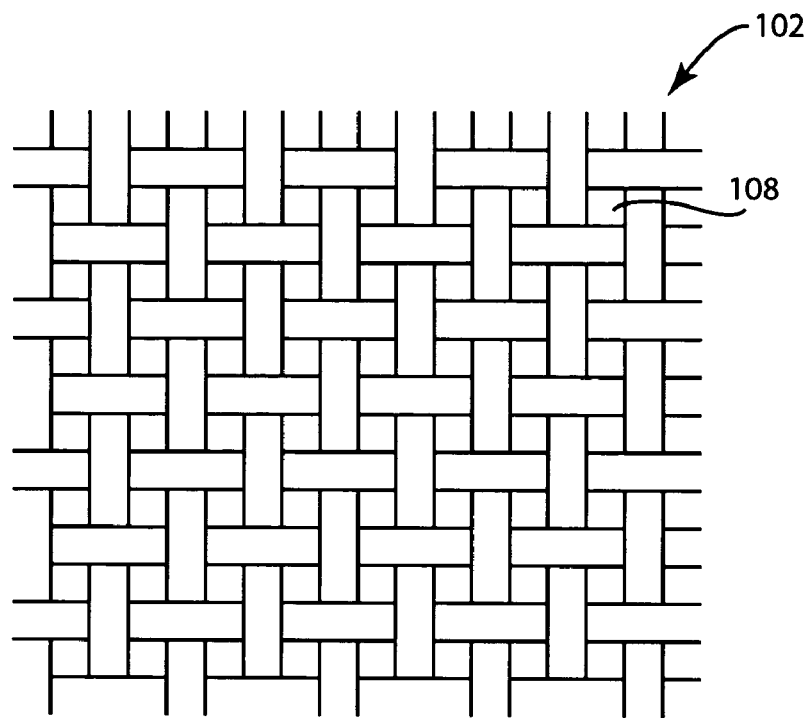
FIG. 1 shows a schematic illustration of a porous substrate having nanowires attached to its surfaces.

The present invention generally provides novel articles and compositions that employ nanowire surfaces or surface portions to impart unique physical, chemical and electrical properties. In particular, the present invention is directed, in part, to porous substrates that have nanowires attached to at least a portion of the overall surfaces of the porous substrates in order to provide materials that have a wide range of unique and valuable properties for a wide range of different applications.

The application of nanowires to the various surfaces of porous substrates not only improves the performance of porous substrates in applications where they are already used, but also improves performance of substrate materials in a number of other different applications, where such porous substrates may or may not conventionally be employed.

By way of example, incorporation of nanowire enhanced surfaces in membranes or other semi-permeable barriers can enhance filtration efficiencies. In particular, by providing nanowires within the pores of existing membranes or other permeated layers, one can provide higher filtration efficiencies without the expectant increase in pressure drop across the filter (See Grafe et al., Nanowovens in Filtration-Fifth International Conference, Stuttgart, Germany, March 2003). Relatedly, such nanofibers may be used to impart alternate properties to such barriers, e.g., breathable moisture repellant barriers, antibacterial/antiseptic barriers. Such barriers would be widely applicable in the outdoor clothing industry but would also be particularly useful as bandages or surgical dressings due to their permeability to oxygen but impermeability to moisture or particles including bacteria, as well as the use of antimicrobial nanofibers. This latter application is particularly interesting in light of the dry adhesive characteristics of nanowire/nanofiber enhanced surfaces (see, e.g., U.S. patent application Ser. No. 10/661,381, filed Sep. 12, 2003, incorporated herein by reference in its entirety for all purposes). While some researchers have proposed depositing nanofibers onto membranes to achieve higher surface areas, the ability to attach fibers to the surface, and particularly to grow such fibers, in situ provides numerous advantages over simple deposition of fibers. In particular, in merely depositing fibers on membranes, it is difficult to get uniform or complete, e.g., penetrating, coverage of the fibers over the total surface area of the membrane, whereas in situ growth methods give far better coverage of interior surfaces, and thus providing much greater surface area for the membrane or barrier. Additionally, such methods provide for varied orientations of such fibers from the surfaces to which they are attached, i.e., having fibers extend from the surface as opposed to laying flat against the surface.

In addition to improving the function of porous substrates, the use of porous substrates in conjunction with nanofibers/nanowires also provides a unique, ultra high surface area material that can be used in a wide variety of applications that may have little to do with the use of porous substrates, per se. For example, ultra high surface area electrical components may have a variety of applications as electrodes for interfacing with, e.g., biological tissue (i.e., in pacemakers), coverings for other biological implants as tissue lattice or anti-infective barriers for catheters or the like.

In still other applications, porous substrates provide a unique synthesis lattice for providing dense populations of nanofibers/nanowires for use in a variety of different applications, e.g., for use in composite films, etc. Such films may generally be applied as semiconductive composites, dielectric films, active layers for electronic or photoelectric devices, etc.

A broad range of potential applications exists for these materials/articles and will be apparent to one of ordinary skill in the art upon reading the instant disclosure.

II. Articles of the Invention, Structure and Architecture

As noted above, the articles of the invention incorporate porous substrates as a foundation of the article. The porous substrates used in accordance with the present invention typically include any of a variety of solid or semisolid materials upon which the nanowires may be attached, but through which apertures exist. As such, these substrates may include solid contiguous substrates, e.g., plates, films, wafers that may be flexible or rigid, that have apertures disposed through them, e.g., stamped or etched metal or inorganic perforated plates, wafers, etc., porated or perforated films, or the substrate may include aggregates of solid or semisolid components e.g., fibrous mats, mesh screens, amorphous matrices, composite materials, woven fabrics, i.e., fiberglass, carbon fiber, polyaramid or polyester fabrics, or the like. As will be apparent, any of a wide variety of different types of materials may comprise the substrates, including organic materials, e.g., polymers, carbon sheets, etc., ceramics, inorganic materials, e.g., semiconductors, insulators, glasses, including silica based materials (e.g., silicon, $SiO_2$), etc., metals, semimetals, as well as composites of any or all of these.

Additionally, substrates, e.g., rigid or solid substrates, may be engineered to have additional topographies, e.g., three dimensional shapes, such as wells, pyramids, posts, etc. on their surface to further enhance their effectiveness, e.g., provide higher surface areas; channel fluids or gases over them, provide prefiltration in advance of the filtration provided by the porous substrate, per se, etc. Additionally, although referred to as including a porous substrate, it will be appreciated that in application, multiple substrates may be provided together in a single article, device or system. Further, although described and exemplified primarily as planar porous substrates, it will be appreciated that the porous substrates may be fabricated into any of a variety of shapes depending upon the application, including spheres, cylinders, disks, cubes, blocks, etc. that may be more easily integrated into their desired application.

Examples of metal substrates include steel/iron, nickel, aluminum, titanium, silver, gold, platinum, palladium, or virtually any metal substrate that imparts a desirable property to the finished article, e.g., conductivity, flexibility, malleability, cost, processibility etc. In certain preferred aspects a metal wire mesh or screen is used as the substrate. Such meshes provide relatively consistent surfaces in a ready available commercial format with well defined screen/pore and wire sizes. A wide variety of metal meshes are readily commercially available in a variety of such screen/pore and wire sizes. Alternatively, metal substrates may be provided as perforated plates, e.g., solid metal sheets through which apertures have been fabricated. Fabricating apertures in meal plates may be accomplished by any of a number of means. For example relatively small apertures, e.g., less than 100 µm in diameter, as are used in most preferred aspects of the invention, may be fabricated using lithographic and preferably photolithographic techniques. Similarly, such apertures may be fabricated using laser based techniques, e.g., ablation, laser drilling, etc. For larger apertures, e.g., greater than 50-100 μm, more conventional metal fabrication techniques may be employed, e.g., stamping, drilling or the like.

Polymeric and inorganic substrates may be similarly structured to the metal substrates described above, including mesh or screen structures, fibrous mats or aggregates, e.g., wools, or solid substrates having apertures disposed through them. In terms of polymeric substrates, again, the primary selection criteria is that the substrate operate in the desired application, e.g., is resistant to chemical, thermal or radiation or other conditions to which it will be exposed. In preferred aspects the polymeric substrate will also impart other additional useful characteristics to the overall article, such as flexibility, manufacturability or processibility, chemical compatibility or inertness, transparence, light weight, low cost, hydrophobicity or hydrophilicity, or any of a variety of other useful characteristics. Particularly preferred polymeric substrates will be able to withstand certain elevated environmental conditions that may be used in their manufacturing and/or application, e.g., high temperatures, e.g., in excess of 300 or 400° C., high salt, acid or alkaline conditions, etc. In particular, polymers that tolerate elevated temperatures may be particularly preferred where the nanowires are actually grown in situ on the surface of the substrate, as such synthetic processes often employ higher temperature synthetic processes, e.g., as high as 450° C. Polyimide polymers, polyetherketone, polyaramid polymers and the like are particularly preferred for such applications. Those of skill in the art will recognize a wide range of other polymers that are particularly suitable for such applications. Alternatively, lower temperature fiber synthesis methods may also be employed with a broader range of other polymers. Such methods include that described by Greene et al. ("Low-temperature wafer scale production of ZnO nanowire arrays", L. Greene, M. Law, J. Goldberger, F. Kim, J. Johnson, Y. Zhang, R. Saykally, P. Yang, Angew. Chem. Int. Ed. 42, 3031-3034, 2003), or through the use of PECVD, which employs synthesis temperatures of approximately 200° C. In the case where the porous substrate is merely the recipient of nanofibers already synthesized, e.g., where the substrate is either to be coupled to the nanowires or is to act as a macroporous support for the nanowires, a much wider variety of porous substrates may be employed, including organic materials, e.g., organic polymers, metals, ceramics, porous inorganics, e.g., sintered glass, which would include a variety of conventionally available membrane materials, including cellulosic membranes, i.e., nitrocellulose, polyvinyl difluoride membranes (PVDF), polysulfone membranes, and the like.

In some cases, the porous substrate may comprise a soluble material, e.g., cellulose, or the like. Following attachment of the nanofibers, and optionally placement of the overall substrate into its ultimate device configuration, the supporting porous substrate may be dissolved away, leaving behind an interwoven mat or collection of nanofibers. For example, a soluble mesh may be provided with nanofibers attached to its overall surfaces or interior wall surfaces as described herein. The mesh may then be rolled into a cylindrical form and inserted into a cylindrical housing, e.g., a column for separations applications. The supporting mesh is then dissolved away to yield the column packed with nanofibers. Further, as described above, the porous matrix may comprise any of a number of shapes, and be soluble as well, so as to yield any of a variety of shapes of aggregations of fibers, once the substrate is dissolved.

As noted above, the apertures of the substrates used herein typically are defined in terms of their effective pore size or "effective porosity". Although described as apertures or pores, it will be appreciated that the term "aperture" or "pore" when used in the context that it is disposed through a substrate, refers simply to a contiguous pathway or passage through a substrate material, whether that material be a single solid piece of substrate material or a mesh or mat of aggregated pieces of substrate material. Thus, such "apertures" or pores do not need to represent a single passage, but may constitute multiple passages strung together to form the contiguous path. Likewise, an aperture or pore may simply represent the space between adjacent portions of substrate material, e.g., fibers, etc. such that the spaces provide a contiguous path through the material. For purposes of the invention, pore or aperture size, in the absence of any nanofibers disposed thereon, will typically vary depending upon the nature of the application to which the material is to be put.

For example, filtration applications will typically vary pore size depending upon the nature of the particles or other material to be filtered, ranging from tens to hundreds of microns or larger for coarser filtration operations to submicron scale for much finer filtration applications, e.g., bacterial sterilizing filters. Similarly for semi-permeable barrier applications, such pores will typically vary depending upon the type of permissible permeability is sought. For example, breathable moisture barriers may have pore sizes from tens of microns to the submicron range, e.g., 0.2 μm, or smaller. In some cases, it may be desirable to have an effective pore size that is less than 100 nm, and even less than 20 nm, so as to block passage of biological agents, e.g., bacteria and viruses.

The articles and substrates described herein may include nanowires substantially on any and all surfaces of the substrate material including both exterior surfaces and the surfaces that are within the pores. Together, these surfaces upon which nanowires may be disposed are referred to herein as the "overall surface" of the substrate material, while the wall surfaces that are disposed upon the interior walls of the pores are generally referred to herein as the "interior wall surfaces" of the substrate material or pores. As will be clear to one of ordinary skill in reading the instant disclosure, a reference to a surface as an interior wall surface for certain embodiments, e.g., in the case of a fibrous mat or wool like substrate does not necessarily denote a permanent status of that surface as being in the interior portion of a pore or aperture as the basic flexibility and/or malleability of certain substrate materials may provide the ability to shift or move the various portions of the substrate material's overall surface around.

As noted above, the substrates of the invention gain significant unique properties by incorporating nanofibers or nanowires on their surfaces. For most applications, the terms "nanowire" and "nanofiber" are used interchangeably. However, for conductive applications, e.g., where the nanofibers conductive or semiconductive properties are of interest, the term "nanowire" is generally favored. In either instance, the nanowire or nanofiber generally denotes an elongated structure having an aspect ratio (length:width) of greater than 10, preferably greater than 100 and in many cases 1000 or higher. These nanofibers typically have a cross sectional dimension, e.g., a diameter that is less than 500 nm and preferably less than 100 nm and in many cases, less than 50 nm or 20 nm.

The composition of the nanofibers employed in the invention typically varies widely depending upon the application to which the resulting substrate material is to be put. By way of example, nanofibers may be comprised of organic polymers, ceramics, inorganic semiconductors and oxides, carbon nanotubes, biologically derived compounds, e.g., fibrillar proteins, etc. or the like. For example, in certain embodiments, inorganic nanofibers are employed, such as semiconductor nanofibers. Semiconductor nanofibers can be comprised of a number of Group IV, Group III-V or Group II-VI semiconductors or their oxides. Particularly preferred nanofibers include semiconductor nanowires or semiconductor oxide nanofibers.

Typically, the nanofibers or nanowires employed are produced by growing or synthesizing these elongated structures on substrate surfaces. By way of example, Published U.S. Patent Application No. US-2003-0089899-A1 discloses methods of growing uniform populations of semiconductor nanowires from gold colloids adhered to a solid substrate using vapor phase epitaxy. Greene et al. ("Low-temperature wafer scale production of ZnO nanowire arrays", L. Greene, M. Law, J. Goldberger, F. Kim, J. Johnson, Y. Zhang, R. Saykally, P. Yang, Angew. Chem. Int. Ed. 42, 3031-3034, 2003) discloses an alternate method of synthesizing nanowires using a solution based, lower temperature wire growth process. A variety of other methods are used to synthesize other elongated nanomaterials, including the surfactant based synthetic methods disclosed in U.S. Pat. Nos. 5,505,928, 6,225,198 and 6,306,736, for producing shorter nanomaterials, and the known methods for producing carbon nanotubes, see, e.g., US-2002/0179434 to Dai et al. As noted herein, any or all of these different materials may be employed in producing the nanofibers for use in the invention. For some applications, a wide variety of group III-V, II-VI and group IV semiconductors may be utilized, depending upon the ultimate application of the substrate or article produced. In general, such semiconductor nanowires have been described in, e.g., US-2003-0089899-A1, incorporated herein above. In certain preferred embodiments, the nanowires are selected from a group consisting of: Si, Ge, Sn, Se, Te, B, Diamond, P, B—C, B—P(BP6), B—Si, Si—C, Si—Ge, Si—Sn and Ge—Sn, SiC, BN/BP/BAs, AlN/AlP/AlAs/AlSb, GaN/GaP/GaAs/GaSb, InN/InP/InAs/InSb, BN/BP/BAs, AlN/AlP/AlAs/AlSb, GaN/GaP/GaAs/GaSb, InN/InP/InAs/InSb, ZnO/ZnS/ZnSe/ZnTe, CdS/CdSe/CdTe, HgS/HgSe/HgTe, BeS/BeSe/BeTe/MgS/MgSe, GeS, GeSe, GeTe, SnS, SnSe, SnTe, PbO, PbS, PbSe, PbTe, CuF, CuCl, CuBr, CuI, AgF, AgCl, AgBr, AgI, $BeSiN_2$, $CaCN_2$, $ZnGeP_2$, $CdSnAs_2$, $ZnSnSb_2$, $CuGeP_3$, $CuSi_2P_3$, $(Cu, Ag)(Al, Ga, In, Tl, Fe)(S, Se, Te)_2$, $Si_3N_4$, $Ge_3N_4$, $Al_2O_3$, $(Al, Ga, In)_2(S, Se, Te)_3$, $Al_2CO$, and an appropriate combination of two ore more such semiconductors.

In the cases of semiconductor nanofibers, and particularly those for use in electrical or electronic applications, the nanofibers may optionally comprise a dopant from a group consisting of: a p-type dopant from Group III of the periodic table; an n-type dopant from Group V of the periodic table; a p-type dopant selected from a group consisting of: B, Al and In; an n-type dopant selected from a group consisting of: P, As and Sb; a p-type dopant from Group II of the periodic table; a p-type dopant selected from a group consisting of: Mg, Zn, Cd and Hg; a p-type dopant from Group IV of the periodic table; a p-type dopant selected from a group consisting of: C and Si; or an n-type is selected from a group consisting of: Si, Ge, Sn, S, Se and Te.

In some cases, it may be desirable to utilize nanofibers that have a self sterilizing capability, e.g., in semipermeable bandage, clothing, filtration or other applications. In such cases, the nanofibers may be fabricated from, e.g., $TiO_2$, which, upon exposure to UV light oxidizes organic materials to provide a self cleaning functionality (See, e.g., U.S. Patent Application No. 60/468,390, filed May 6, 2003, and incorporated herein by reference in its entirety for all purposes).

Additionally, such nanofibers may be homogeneous in their composition, including single crystal structures, or they may be comprised of heterostructures of different materials, e.g., longitudinal heterostructures that change composition over their length, or coaxial heterostructures that change composition over their cross section or diameter. Such coaxial and longitudinal heterostructured nanowires are described in detail in, e.g., Published International Patent Application No. WO 02/080280, which is incorporated herein by reference for all purposes.

The nanowire portion of the articles of the invention are preferably synthesized in situ, e.g., on the desired surface of the porous substrate. For example, in preferred aspects, inorganic semiconductor or semiconductor oxide nanofibers are grown directly on the surface of the porous substrate using a colloidal catalyst based VLS synthesis methods described above. In accordance with this synthesis technique, the colloidal catalyst is deposited upon the desired surface of the porous substrate (which in some cases may include the overall surface of the porous substrate). The porous substrate including the colloidal catalyst is then subjected to the synthesis process which generates nanofibers attached to the surface of the porous substrate. Other synthetic methods include the use of thin catalyst films, e.g., 50 nm, deposited over the surface of the porous substrate. The heat of the VLS process then melts the film to form small droplets of catalyst that forms the nanofibers. Typically, this latter method may be employed where fiber diameter homogeneity is less critical to the ultimate application. Typically, catalysts comprise metals, i.e., gold, and may be electroplated or evaporated onto the surface of the substrate or deposited in any of a number of other well known metal deposition techniques, e.g., sputtering etc. In the case of colloid deposition the colloids are typically deposited by first treating the surface of the substrate so that the colloids adhere to the surface. Such treatments include those that have been described in detail previously, i.e., polylysine treatment, etc. The substrate with the treated surface is then immersed in a suspension of colloid.

Alternatively, the nanofibers may be synthesized in another location and deposited upon the desired surface of the porous substrate using previously described deposition methods. For example, nanofibers may be prepared using any of the known methods, e.g., those described above, and harvested from their synthesis location. The free standing nanofibers are then deposited upon the relevant surface of the porous substrate. Such deposition may simply involve immersing the porous substrate into a suspension of such nanofibers, or may additionally involve pretreating all or portions of the porous substrate to functionalize the surface or surface portions for fiber attachment. A variety of other deposition methods, e.g., as described in U.S. patent application Ser. No. 10/673,092, filed Sep. 25, 2003, and U.S. patent application Ser. No. 10/405,992, filed Apr. 1, 2003, the full disclosures of which are incorporated herein by reference in their entirety for all purposes.

Where nanofibers are desired to be attached primarily to the interior wall portions of the surface of the porous substrate, such deposition may be accomplished by growing the nanofibers in such locations or by selectively depositing the nanofibers in such locations. In the case of in situ grown nanofibers, this may be accomplished by depositing a layer of another material on all of the exterior surfaces of the substrate, e.g., a resist, before depositing the colloids. Following immersion in colloid, the resist layer may be developed and removed to yield substrate having colloid substantially only deposited on the interior wall surfaces of the substrate.

Figure 1B:
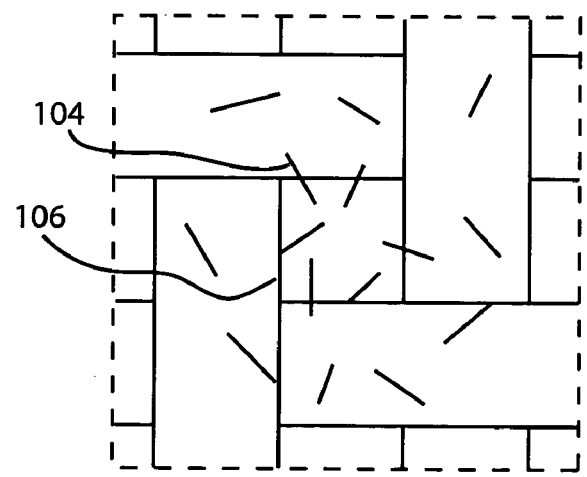

FIGS. 1 and 2 schematically illustrate substrates according to the present invention. In particular, FIG. 1 shows a schematic illustration of a porous nanowire carrying substrate of the invention. As shown in FIGS. 1A and 1B, a porous substrate 102 is provided. For purposes of exemplification, a mesh or screen is employed as the porous substrate, although fibrous mats are also useful in such applications. As shown in FIG. 1B, nanofibers 104 are provided that are, at least in part, disposed on the internal wall portions 106 of the apertures or pores, and which extend into the void area 108 of the pores, yielding openings or passages through the overall material that are somewhat more restrictive or narrow than those provided by the underlying substrate, itself. As shown in FIG. 1, the nanofibers 104 are also disposed on other surface portions of the mesh (the overall surface).

Figure 2A:
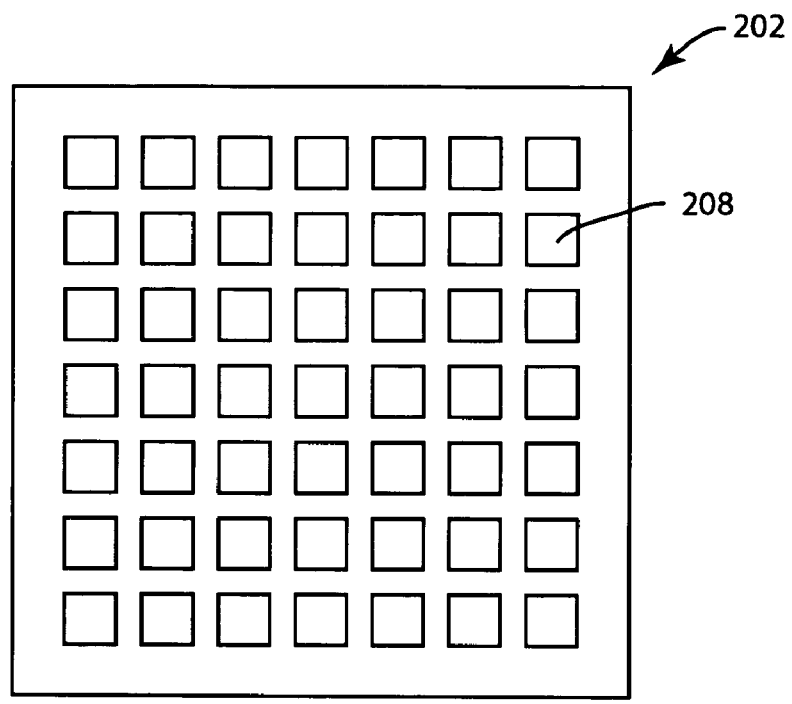
FIG. 2 shows a schematic illustration of nanowires attached to the interior wall portions of a porous substrate material.
Figure 2B:
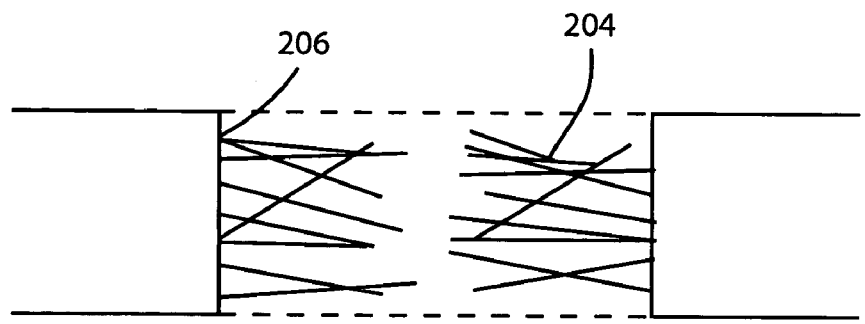

FIGS. 2A and 2B schematically illustrate the case where nanofibers are primarily disposed only on the interior wall portions of the apertures that define the pores. As shown, a perforated substrate 202 forms the underlying porous substrate. A plurality of apertures 208 are fabricated through the substrate 202, e.g., by punching etching or other known fabrication methods. As shown in FIG. 2B, an expanded view of the aperture 208 is provided that details the presence of nanofibers 204 attached to the interior wall portions 206 of the aperture. As shown, the nanofibers generally protrude away from the interior wall surface 208. This is typically accomplished by growing the nanofibers, in situ, using a catalytic growth CVD process, whereupon the fibers grow away from the surface upon which the catalyst is initially deposited. Other methods may also be employed to deposit nanofibers on these interior wall portions that may or may not result in the fibers protruding into the void space of the apertures, including immersing the porous substrate in a suspension of nanofibers that are chemically able to attach to the surfaces of interest.

Figure 12A:
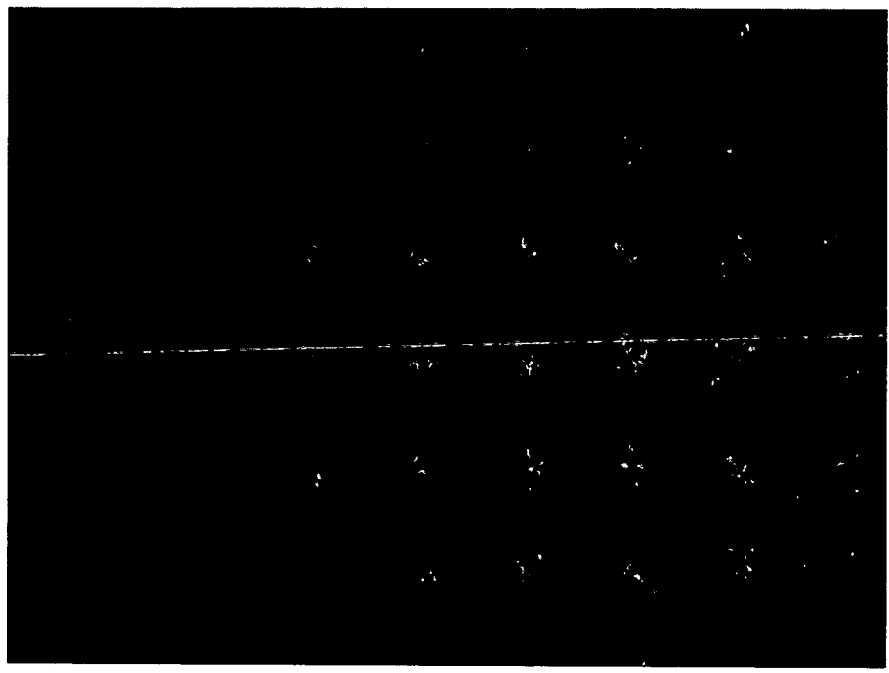
FIG. 12 illustrates an example of the nanofiber bearing, porous substrates of the invention.
Figure 12B:

FIG. 12 shows a photograph of a silicon substrate that has pores or apertures disposed through it. Silicon nanofibers were grown over the surface of the substrate, including within the pores. The substrate was a 0.1 mm thick silicon wafer with regularly spaced 100 μm holes disposed through it. FIG. 12A shows a view of a larger area of the substrate, while FIG. 12B shows a closer up view of the pore and substrate surface, as well as the nanofibers on those surfaces.

In alternative arrangements, the porous substrates may be employed in steps that are discrete from the synthesis process, and that employ the porous substrate as a capture surface for the nanofibers. In particular, nanofibers may be produced as suspensions or other collections or populations of free-standing, e.g., a population of discrete and individual members, nanofibers. Such free standing nanofibers are generally produced from any of the aforementioned processes, but including a harvest step following synthesis whereby the nanofibers are removed from a growth substrate and deposited into a suspending fluid or other medium or deposited upon a receiving substrate, or otherwise moved from a growth or synthesis environment into a manipulable environment, e.g., a fluid suspension. The population of nanowires is then deposited over a porous substrate to yield a mat of deposited nanofibers that form a micro or nanoporous network over the underlying porous substrate. In accordance with this aspect of the invention, the pores in the porous substrate are typically selected so that they are smaller than the largest dimensions of the nanofibers to be deposited thereon, e.g., the length of the nanofiber. For example, where nanofibers in a particular population have an average length of approximately 10 μm, the pores in the substrate will typically be smaller in cross section than 10 μm, e.g., less than 5 μm, less than 2 μm, or smaller. To ensure sufficient capture of nanofibers, the largest cross section of the pore in the porous substrate will typically be less than 50% of the average largest dimension of the nanofiber population, generally the length, in some cases, less than 20% of such dimension, and in many cases, less than 10% of such dimension.

The nanofiber mat is then optionally fused or cross-linked at the points where the various fibers contact each other, to create a more stable, robust and potentially rigid fibrous membrane. The void spaces between the interconnected nanofibers form the porous network of the nanofibrous mat. The effective pore size of the mat will generally depend upon the density of the deposited nanofiber population that is deposited, as well as the thickness of that layer, and to some extent, the width of the nanofibers used. All of these parameters are readily varied to yield a mat having a desired effective porosity.

Figure 9:
FIG. 9 shows an electron micrograph of cross-fused or linked nanowires creating an independent mesh network as used in certain aspects of the present invention.

FIGS. 9A and 9B show electron micrographs of cross-linked nanofibrous mats that illustrate certain aspects of the invention. FIG. 9A shows a population of semiconductor nanofibers that were cross-linked through vapor deposition of inorganic material, e.g., silicon. In particular, a population of silicon nanowires was prepared by a conventional synthesis scheme, e.g., silicon nanowires were grown at 480° C., from a gold colloid catalyst, under SiH4 partial pressure, 1 torr, total pressure, 30 torr for 40 minutes). After the growth was terminated by pumping out the process gasses, the temperature of the substrate was ramped up to 520° C. under 30 torr He. The process gases ($SiH_4$) were switched on again once temperature was reached, and the resulting silicon deposition cross-linked the adjacent or contacting nanowires. The deposition time was 10 minutes. As will be appreciated, separately harvested and deposited nanofibers may be similarly crosslinked using this technique.

The nanofibers fibers in FIG. 9B, on the other hand, were linked using a polymer deposition process that at least partially coated or encased the nanofibers to link them together. In particular, a PVDF polymer was suspended along with the nanowires in acetone and sonicated. The acetone was then evaporated to yield the encapsulated or crosslinked nanowires or nanofibrous mat. As can be seen in each case, the network of silicon nanofibers, or nanowires, shows cross-linking at the intersections of various nanofibers. Also as shown, the pores created by the interwoven nanofibers are defined by the void space between the nanofibers.

As noted above, the alternative aspects of the invention may be accomplished by simply depositing nanowires upon a receiving or supporting substrate such that the nanofibers are overlaying each other to form a mat, and preferably a dense nanofiber mat. In general, this process is simplified by using a porous supporting substrate such that the nanofibers may be captured upon the upper surface of the porous supporting substrate while the medium in which the nanofibers were originally disposed is allowed to pass through the pores, essentially filtering the nanofibers with the substrate and densely depositing the nanofibers on the surface of the substrate. The resulting fibrous mat is then treated to crosslink the fibers at the points where they contact or are sufficiently proximal to each other.

Figure 10:
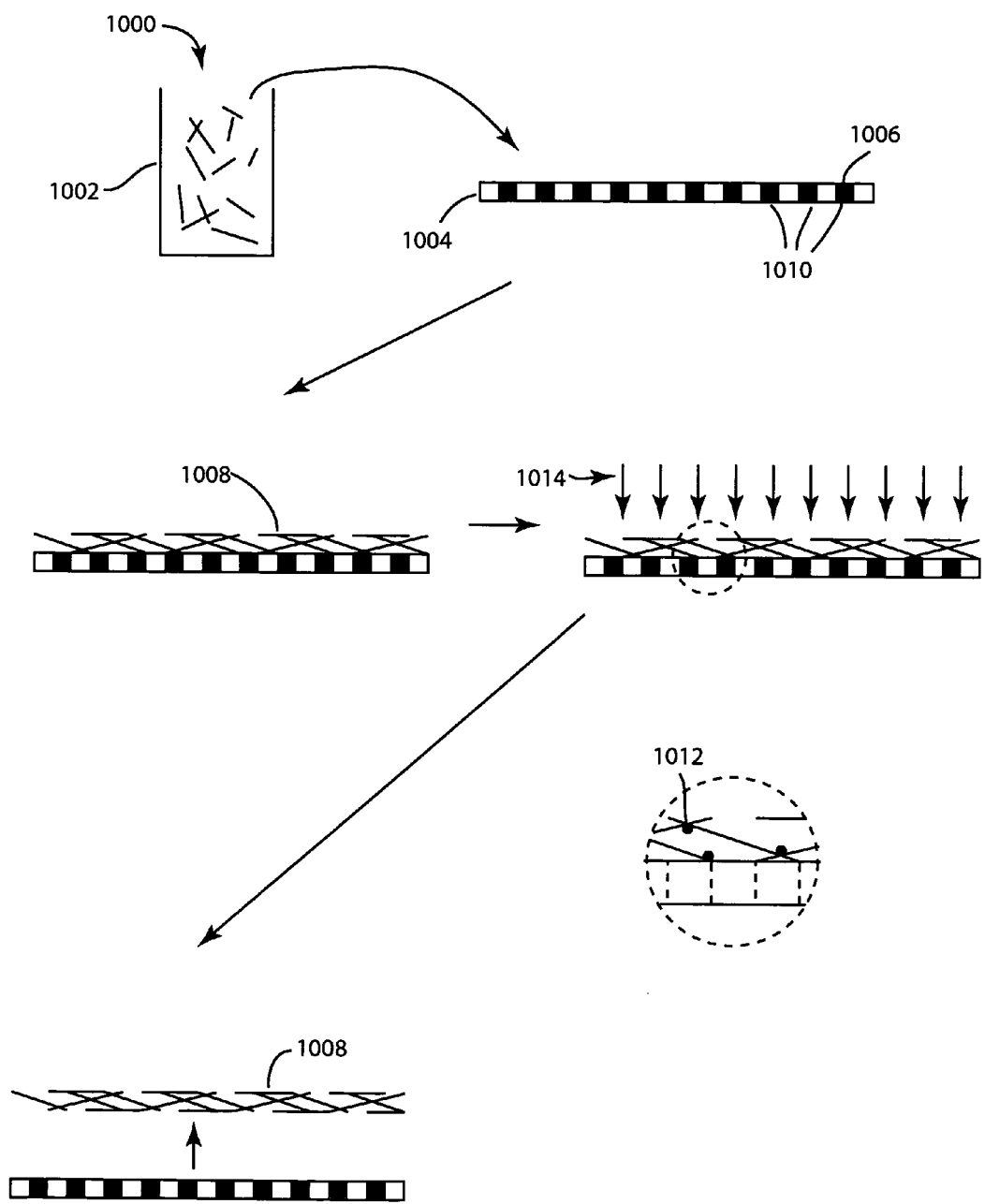
FIG. 10 schematically illustrates a process for producing a cross-linked nanowire mesh network for use either in conjunction with or independent from an underlying porous, e.g., macroporous, substrate.

The process for such mat formation is schematically illustrated in FIG. 10. In particular, a nanofiber population 1000 is provided as a suspension 1002, where the nanofibers may be suspended in liquid, gas, or simply provided as a free flowing population or powder. The nanofiber population is then deposited or poured onto a porous substrate 1004. The nanofiber population 1000 is then retained upon the upper surface 1006 of the porous substrate 1104, at which point it forms an overlaying mat 1008 of nanofibers supported by substrate 1004. The mat 1008 is added to by depositing additional nanofibers onto the substrate. As noted previously, any medium in which the nanofibers are suspended freely passes through pores 1010 in the porous substrate 1004, allowing the nanofibers to pack densely against the upper surface 1006 of the porous substrate 1004.

Once the nanofiber mat 1008 is of the desired thickness and fiber density, the mat may be readily employed upon its supporting macroporous substrate, e.g., as a filter membrane or other semipermeable layer. However, in preferred aspects, the nanofibrous mat is treated (as indicated by arrows 1014) to crosslink the nanofibers at their respective contact points to form couplings 1012 between the nanofibers in the mat, as shown in the expanded view. The use of crosslinked nanofibers has been described for ultra high surface area applications (See, e.g., commonly owned U.S. patent application Ser. No. 10/840,794, filed May 5, 2004, and incorporated herein by reference in its entirety for all purposes). Crosslinking, as noted previously, may be accomplished by a number of means, including thermal fusing, chemical surface modification/crosslinking, encapsulation or coating. Thermal fusing methods may vary depending upon the makeup of the nanofibers with polymeric nanofibers being fused at substantially lower temperatures than metal or inorganic semiconductor nanofibers.

Nanofibers may also include surface chemical groups that may form chemical crosslinks in order to cross-link the underlying nanofibers. For example, polymeric materials, such as polyacrylamide or polyethylene glycol groups may be readily coupled to the surfaces of nanofibers, e.g., through well known silane and/or pegylation chemistries. Well known polymer crosslink king techniques are then used to crosslink the nanofibers. Similarly, epoxide, acrylate or other readily available reactive groups may be provided upon the surface of the nanofibers that allow thermal curing, optical curing, e.g., UV, or other chemical interaction and coupling between adjacent, contacting nanofibers to provide the crosslinking.

In another aspect, the nanofibrous mat may be crosslinked together using a polymer coating or encapsulation technique that locks the various nanofibers into position. For example, vapor deposition techniques may be employed to vapor deposit thin polymer layers over the nanofiber portions of the mat, effectively cementing the nanofibers into position. Examples of such polymers include, e.g., PTFE, PVDF, parylene, and the like. A wide variety of other polymeric materials may optionally be employed using a liquid deposition or an in situ polymerization and/or crosslinking techniques, e.g., as described above. As will be appreciated, polymeric crosslinking may provide certain benefits over thermal and/or chemical crosslinking in terms of pliability of the resulting mat of material.

Once the nanofibrous mat is crosslinked, it may be employed along with the underlying macroporous substrate, e.g., as a backing, or it may be separated from the substrate to yield an independent nanofibrous membrane, e.g., membrane 1016. As will be readily appreciated, larger area nanofiber layers may be produced using conventionally available processes, including drum or belt filter techniques where a large area, continuous macroporous substrate layer, e.g., in a belt or as a surface of a drum, is used to retain nanofiber layers, which layers are crosslinked or otherwise treated as described herein. Such processes may be configured in a continuous or large area batch mode operation in order to provide extremely large amounts of the fibrous layer material, e.g., for use in clothing, outdoor fabrics, e.g., tents, and other high volume applications.

III. Applications

As alluded to herein, the porous substrates of the invention having nanofibers attached to portions of their surfaces have myriad applications that take advantage of a wide variety of particularly interesting properties of such materials. In certain applications, the presence of nanowires provides porous materials with enhanced properties. In other applications, the combination of porous substrates and nanowires provides materials having substantially new properties and usefulness.

A. Semi-Permeable Barriers

In a first particularly preferred application, the porous substrates of the invention are useful as semi-permeable barriers. Semi-permeable barriers, in general, also find a wide variety of different applications depending upon their level of permeability, cost, etc. For example, such barriers may be permeable to gas and not liquid, or to air or gas and not particulate matter. Still further, such semi-permeable barriers may provide antiseptic or antibacterial properties to their applications.

1. Filtration

In their simplest aspect, semi-permeable barriers are used as filtration media for separating gases or liquids from particulate matter. For example, there are a wide range of different filtration options available for e.g., air filtration, from simple consumer filtration needs, e.g., home furnaces, air conditioners, air purifiers, to more demanding filtration needs, e.g., HEPA filtration for industrial use, hazardous materials filtration for protective gear, clean room applications, automotive applications, etc. For liquid applications, such filters may provide water purification, particulate separation for fuels and lubricants for industrial or consumer machinery, e.g., automobiles, etc.

In accordance with the filtration applications of the present invention, porous substrates are used as the foundation for the filtration media to be produced. Nanofibers are then provided on the surfaces overall or substantially only interior surfaces to further enhance the filtration capabilities of the underlying porous foundation. In particular, one of the key areas that are sought for improvement in filtration media is the ability to increase the filtration efficiency, e.g., reduce the pore size or increase the overall capacity/lifetime of a filter, without yielding a substantial increase in the pressure drop, which could lead to early filter failure/clogging, higher energy demands, etc.

The enhancements brought by the present invention include effectively decreasing the pore size of the filter without substantially increasing the pressure drop across a filter. In particular, the present invention provides porous substrates having nanofibers disposed within the pores of the substrate to provide additional filtration by modifying the effective pore size. Nanofibers, because of their extremely small size, are particularly useful in these applications due to their ability to substantially increase the surface area within a pore without substantially increasing the volume of material disposed within that pore, this increasing the filtration efficiency without decreasing the flow through the filter media. Fluids or gases are then passed through the porous substrate to separate particulate materials from the carrier liquid or gas.

Figure 3A:
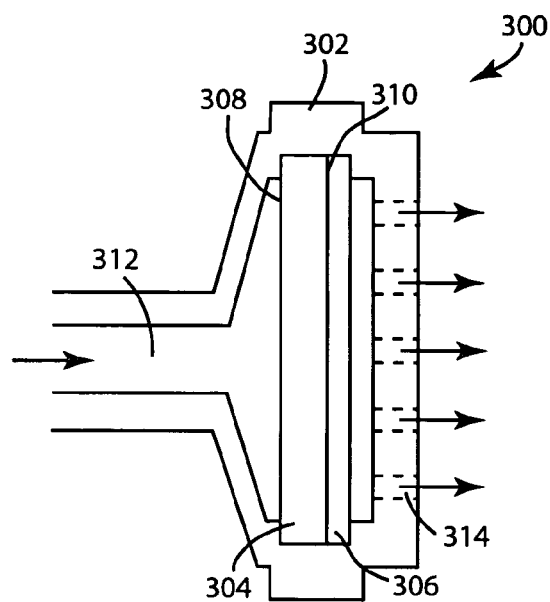
FIG. 3 shows a schematic illustration of the articles of the invention incorporated in a filtration cartridge.
Figure 3B:
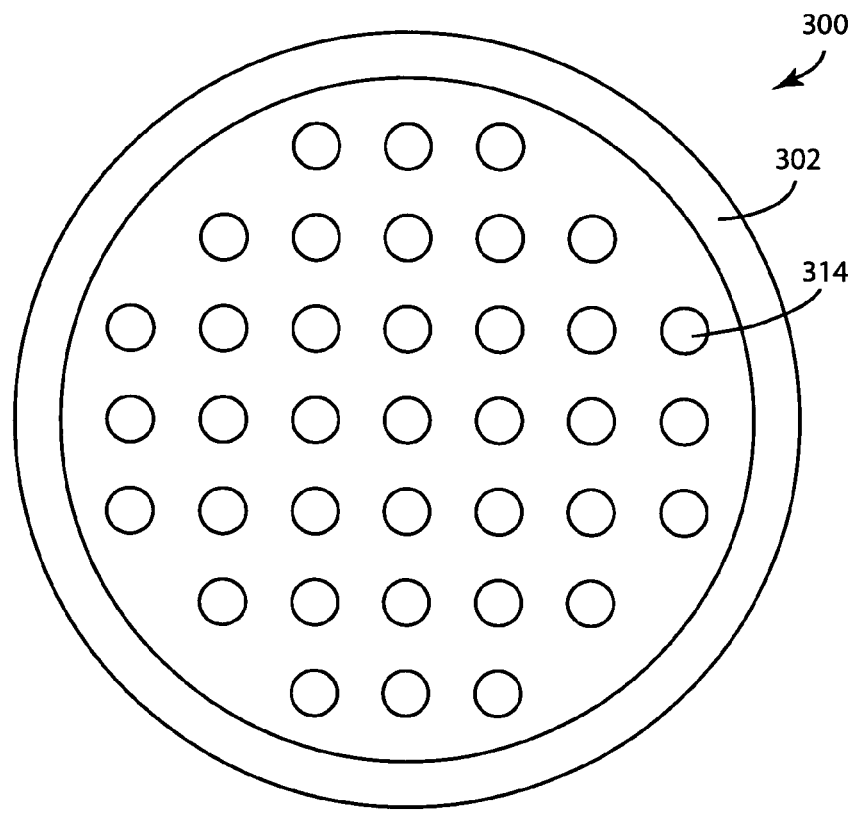

One example of a filtration cartridge, e.g., for a filter mask, gas line or the like, is illustrated in FIGS. 3A and 3B. As shown in FIG. 3A, a filter cartridge 300 includes a main housing 302 having a filter layer 304 disposed within the housing. A filter support 306 is typically also included on the low pressure side of the filter layer to provide structural support to the filter layer. The filter layer typically includes an inlet or high pressure side 308 and a low pressure or outlet side 310. Gas or liquid is filtered through the cartridge by passing from the high pressure or inlet side to the low pressure or outlet side of the filter. The filter cartridge thus includes an inlet passage 312 or passages for passing gas or fluid to the inlet side of the filter layer to be filtered, and an outlet passage 314 or passages for passing gas or fluid that has been filtered through the filter layer 304. Filter 3B shows an end view of the outlet side of the particular filter cartridge shown in FIG. 3A.

As noted, the filtration cartridge may be incorporated into larger systems depending upon the ultimate application. For example, air filters may be incorporated into heating and air conditioning or other environmental control systems to provide purified air for, e.g., commercial or industrial, i.e., clean room, applications. Filtration cartridges of the invention may optionally be incorporated into fluid filtration systems as well, for water, fuel or chemical filtration applications.

In accordance with the filtration applications, effective pore sizes of the filter media may be varied depending upon application, e.g., from coarse particle filtration, e.g., effective pore sizes of 1, 10 or more microns, to antibacterial filtration, e.g., effective pore sizes of 0.2 µm or less, e.g., down to 20 nm or less. As alluded to elsewhere herein, the phrase "effective pore size" does not necessarily reflect the size of a discrete passage through the substrate, but instead may reflect the cross sectional dimensions of a contiguous path through which fluid, gas or particles may pass, or be blocked from passing. In addition, the "effective pore size" of a given passage does not necessarily define the absolute dimensions of the contiguous passage, but instead defines the size of the particles that are effectively blocked from passing through the passage. Typically, such varied pore sizes will be of a function of nanowire density disposed within the larger apertures that exist in the underlying substrate, the diameter and length of the nanofibers, as well as a result, to some extent of the size of such apertures to begin with.

Similarly, the composition or make up of the filtration media, both in terms of nanofibers and the underlying substrate may depend upon the application to which the material is to be put, with materials being generally selected to withstand the conditions to which they will be expose. Such conditions might include extremes of temperature, alkalinity or acidity, high salt content, etc.

2. Breathable Moisture Barriers

In a related aspect, the substrate is configured to be permeable to gas, e.g., air, while remaining impermeable to liquid. For example, such barriers are particularly useful as breathable moisture barriers for clothing and medical applications, allowing moisture vapor, oxygen and other gases to pass through the barrier freely, but preventing liquid from passing. In accordance with the invention, this is accomplished by providing nanofibers within the apertures that are disposed through the porous substrate. In contrast to other aspects of the invention however, the nanofibers for the moisture barrier applications are selected or treated to have increased hydrophobicity. Treatment of nanofibers surfaces to increase hydrophobicity was described in detail in U.S. Patent Application No. 60/466,229, filed Apr. 28, 2003, which is hereby incorporated herein by reference in its entirety for all purposes. In particular, the nanofibers and or the substrate surface may be derivatized to attach hydrophobic chemical moieties to their surfaces to increase the hydrophobicity of the material. Those of ordinary skill in the art are well versed in the coupling of hydrophobic chemical moieties to substrates, including, e.g., silane chemistries for treating silica based substrates, and the like. By providing such super hydrophobic nanofiber surfaces on porous underlying substrates, one can prevent passage of liquids, e.g., liquid water or other aqueous solutions, while permitting air, water vapor or other gases to pass. Typically, such barriers will be substantially impermeable to moisture, e.g., preventing passage of the substantial majority of moisture that comes into contact with the surface under ambient conditions.

Figure 4A:
FIG. 4 shows a schematic illustration of a layered textile that incorporates a substrate of the invention as a semi-permeable moisture barrier for use in, e.g., outdoor clothing.
Figure 4B:
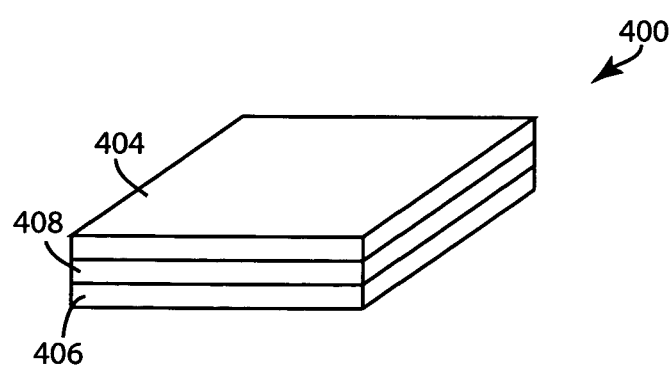

Such moisture permeable barriers are particularly useful in outdoor gear, such as clothing, shelters, etc. where it is desirable to eliminate moisture generated from within, while not permitting liquid water to enter. FIGS. 4A and 4B schematically illustrate a layered textile product, e.g., coat 400, that is comprised of a layered textile 402 (shown in exploded view in FIG. 4B). As shown, a layer of the porous nanofiber bearing substrate material 408 is provided between layers of other material, e.g., a nylon outer shell 404 and cotton or polypropylene fabric lining 406, which provides external protection from wind and cold and internal comfort against the skin or clothing of the wearer.

3. Bandages

In another preferred embodiment, these moisture permeable barriers are useful as bandages or wound dressings, as they allow oxygen to reach wound areas, gas and vapor to escape wound areas, all the while preventing liquid water and other harmful forces/abrasions, etc., from contacting the wound areas. In addition to their benefits as semi-permeable barriers, the nanofibers coated surfaces also may provide adhesion, to maintain the bandage in place, e.g., adhering the bandage to itself or the skin around the wound area. Use of nanofibers surfaces as dry adhesives or high friction materials is described in detail in U.S. patent application Ser. No. 10/661,381, filed Sep. 12, 2003, and incorporated herein by reference in its entirety for all purposes. Additionally, such nanofibers coatings may comprise antimicrobial materials, e.g., ZnO or the like, to help prevent any infections in the wound areas.

Figure 5A:
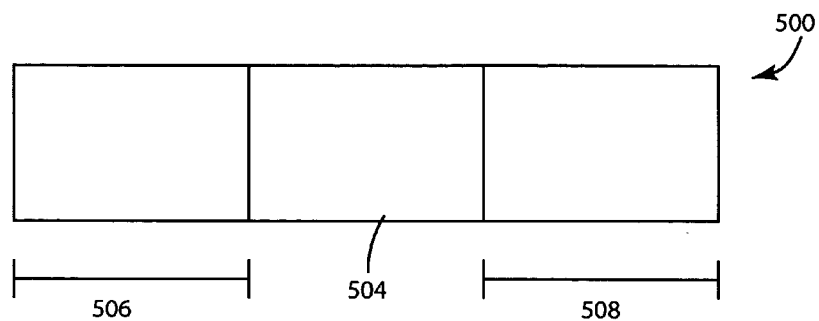
FIG. 5 of the articles of the invention incorporated in a self adhesive, moisture repellant bandage
Figure 5B:
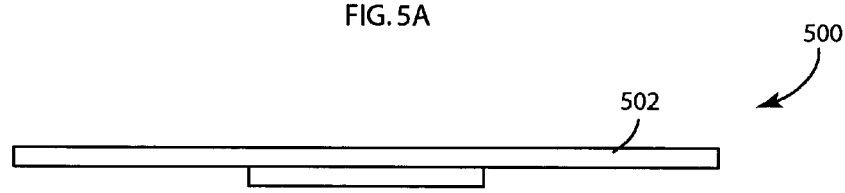

FIG. 5 schematically illustrates a self adhesive, semi permeable, moisture repellant bandage as described above. As shown, a bandage 500 includes a flexible porous substrate strip 502 of the invention, e.g., a woven fabric or soft mesh materials, i.e., a polymer or cloth mesh, having nanofibers that are appropriately treated to provide a hydrophobic barrier, e.g., a moisture barrier (represented by hatching on strip 502). The substrate strip 502 functions both as a breathable moisture impermeable cover and as an adhesive strip. A protective pad 504 is provided upon a portion of one side of the substrate strip 502 to provide protection for a wound that is covered by the bandage. When applied to a wound, the protective pad overlays the wound to provide protection from rubbing or other contact, while the portions 506 and 508 of the strip provide adhesion to the surface tissues adjacent a wounded area (or when wrapped completely around a wounded appendage, to opposing surface of the other end of the substrate strip, e.g., region 506 adheres to the back side of region 508).

B. High Contact Surface for, e.g. Electrical Interfacing

As alluded to previously, the above described applications typically employ nanofibers disposed upon a porous substrate to provide enhanced properties to the porous substrates, e.g., enhanced porosity for filtration, moisture repulsion, etc. However, in a number of applications, applying nanofibers to a porous substrate provides a unique material that is not employed simply for its porosity, but for other properties that are enhanced by the synergistic structural characteristics of small dimensions materials coupled to a high surface area underlying substrate.

In particular, application of nanofibers to a porous substrate, as a result of its higher surface area, provides for higher packing levels of nanofibers per square centimeter of projected area. In particular, dense mats of nanofibers may be provided joined together on the porous substrate, which density levels would not be readily achieved on flat surfaces. The higher surface area of nanofibers is also readily accessible via the apertures or pores in the underlying substrate.

In addition to the increase in nanofibers densities and/or higher surface areas, porous substrates, e.g., meshes and fibrous mats, tend to be flexible by comparison to more rigid, solid substrates, e.g., silicon wafers, metal plates, or the like. Additionally, depending upon the relative porosity of the substrate, the overall article may benefit from being partially or even substantially translucent or transparent, e.g., like a window screen.

C. High Surface Area/High Density Fiber Applications

Separate and apart from the properties set forth above, porous substrates can also provide a lightweight, high density lattice for maintaining, handling, storing and otherwise using nanofibers. Nanofibers may be harvested from this lattice, or portions of the lattice may be used in their entirety to be applied in more nanofiber specific applications, e.g., as semiconductive elements, composite filler materials for structural or electrical enhancement, high surface area matrices, e.g., for separations, or the like.

In still other applications, the porous substrates having nanowires disposed thereon may provide electrical integratability to the nanofibers (or in this case, specifically nanowires) that are attached thereto. Specifically, use of conductive porous substrates may provide at least a portion of the electrical connection to the nanowires necessary for the given application. For example, semiconductor nanowires coupled to a metallic or other conductive or semiconductive mesh are already partially integrated into an electrical circuit, e.g., the mesh becomes an electrode, e.g., source or drain, in the overall device.

The following description includes a number of such specific examples of applications that benefit from the aforementioned properties for illustration purposes alone. However, a much larger number of specific uses applications of the substrates and articles of the invention will be readily apparent to those of skill in the art upon the realization of the above-described benefits, and the following description should not be viewed as limiting and no way excludes such applications.

In a first exemplary application, the substrate of the invention is used as one electrode in a diode configuration. In particular, a conductive mesh is used as the underlying porous substrate with nanowires attached to its surfaces, e.g., overall surface. The composition of the mesh is selected to have a work function that promotes conduction of the major carriers in the nanowire portion. For its part, the nanowire portion is selected to provide one half of the diode circuit, and may include, e.g., p doped nanowires. In accordance with this architecture, the nanowire coated porous substrate functions as a portion of the diode circuit. The other portion of the diode circuit may be provided as either a conventional semiconductor substrate or as a mirror image of the first, except with the materials being selected to conduct the other carriers, e.g., holes, e.g., by providing n-doped nanowires and appropriate electrode compositions for the underlying substrate. The two substrates are then mated to interface the nanowires at the surface to provide the functioning diode. Additional elements may also be provided to ensure proper contact between the nanowires, including conductive elements, annealing steps, etc.

In another exemplary application, high surface area nanowire coated substrates may be used as electrodes for interfacing with other elements, e.g., electrical or non-electrical, such as human tissue for electrical stimulation of the tissue. By way of example, electrodes for pace makers typically benefit from having high surface areas, and thus making more complete contact to the tissue they are stimulating. Relatedly, where the nanofiber coated article is being used as a tissue lattice, e.g., to facilitate bioincorporation, higher surface areas and greater porosity are highly beneficial in providing adherence points without blocking access to such tissue by nutrients etc. Specifically, as described in U.S. Patent Application No. 60/468,390, filed May 6, 2003, nanofiber coated surfaces on medical implants provide 'non-tortuous path' enhanced surface areas that can provide enhanced tissue adhesion and bioincorporation. It is expected that by providing such nanofiber surfaces over porous underlying substrates, these properties will be further enhanced.

In a particular application, such a diode arrangement is employed as a photoactive element, e.g., as a photovoltaic or photodiode device. The use of partially or substantially translucent porous substrates facilitates this application in letting light pass through the electrode components to impinge on the semiconductor nanowires, thus generating charge separation at the heterojunction of the opposing nanowires. Selection of materials for the opposing underlying substrates may follow the same criteria as used in conventional photovoltaic devices. For example, one underlying substrate mesh may be comprised of aluminum while the other is comprised of another metal having a different work function, e.g., ITO, or a similar conductive material.

Previously described nanocomposite photovoltaics have employed an active layer of a nanocomposite material sandwiched between two conductive layers that function as electrodes. The upper electrode typically comprises a transparent conductive coating on the active layer, e.g., indium tin oxide (ITO). These nanocomposite photovoltaic devices employed a first component in which initial charge separation occurs. This typically employed a nanocrystal in which an exciton was created upon exposure to light. This nanocrystal component typically conducts one charge carrier better than the other, e.g., electrons. The nanocrystals are typically disposed in a matrix of another material which conducts the other charge carrier, e.g., holes, away from the nanocrystal component. By conducting the two carriers to opposite electrodes, one generates an electric potential. Typically, the hole conducting component comprises an organic semiconducting polymer, e.g., poly-3-hexylthiophene (P3HT), although the hole conducting component can be another nanocrystal of a different composition. The overall architecture of a nanocomposite photovoltaic device is described in detail in, e.g., U.S. patent application Ser. No. 10/656,802, filed Sep. 4, 2003.

Figure 6A:
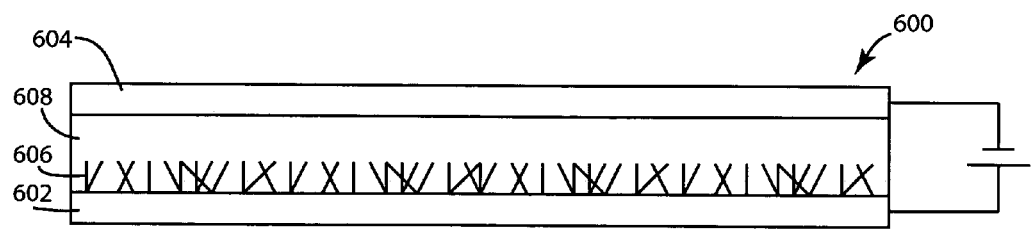
FIG. 6 is a schematic illustration of the substrate material of the invention incorporated into a photovoltaic device.
Figure 6B:
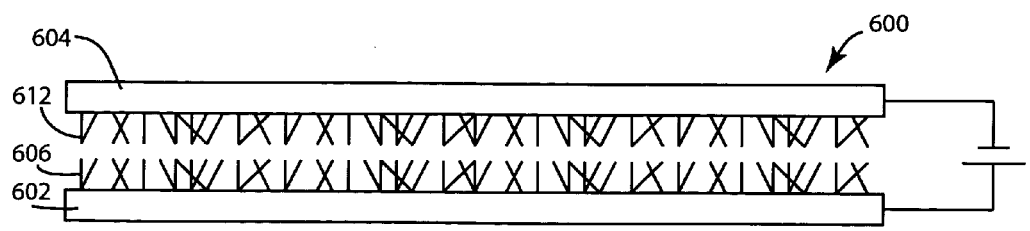

In accordance with the present invention, the overall photovoltaic device 600 includes one (as shown in FIG. 6A), or two (as shown in FIG. 6B) porous substrates 602 and 604 upon which semiconducting nanowires are deposited. The first porous substrate 602 typically comprises a first conductive mesh 602a or other porous material (as described previously herein) that functions as one electrode in the system, e.g., the lower electrode, and includes a first population of nanowires 606 of a first composition attached to its overall surfaces. In a first embodiment shown in FIG. 6A, the first porous substrate 602 and its associated nanofibers is coated with a conductive matrix material 608 that has a type-II band gap offset from the nanowire population 606, so as to affect charge separation. A transparent electrode 610, is then provided over the matrix layer 608.

In a second exemplary embodiment, the upper, transparent electrode 610 in FIG. 6A, is replaced by the second porous substrate 604, which is again fabricated from a conductive mesh 604a, but which includes a different work function from that of the first porous substrate 602, to facilitate charge separation. A second population of nanowires 612 of is provided attached to the second porous substrate 604. The composition of the first and second nanowire populations 606 and 612, respectively, is selected to provide a type-II bandgap energy offset, again, so as to facilitate charge separation and differential conduction. The first and second porous substrates (602 and 604) are then mated together such that their respective nanowire populations 606 and 612, respectively, are in electrical communication so as to permit charge separation between the two layers. As noted elsewhere, herein, in some cases, the opposing nanowire populations may be further processed to permit such electrical communication, including, e.g., thermal annealing, or the like. The use of a dual semiconductor system, e.g., as shown in FIG. 6B, may obviate the need for any organic species within the active layer, e.g., conductive polymers, or the like, and is expected to improve charge separation efficiencies by speeding conduction of their respective carriers to their respective electrodes, and thus prevent recombination of the charges within the active layer.

As will be readily appreciated, the photovoltaic device described above is primarily for the illustration of the applicability of the substrates of the invention to certain electronic or optoelectronic applications. Those of skill in the art will recognize a broad range of other electronic devices in which such substrates would be useful.

In still another exemplary application, porous nanofiber or nanowire coated substrates are encased in matrix components, e.g., a polymer matrix, for use as a composite matrix, including the underlying mesh. Such applications are particularly useful where the nanofibers are being employed as a bulk material to enhance the functionality of the composite matrix. Such enhancements include electrical enhancements, e.g., where the composite is being used as a dielectric material, or to partially orient the nanofibers in optoelectric applications, e.g., photovoltaics, structural enhancements where the presence of the nanofibers imparts unique structural characteristics to the matrix, e.g., tensile strength, elasticity etc.

Figure 7:
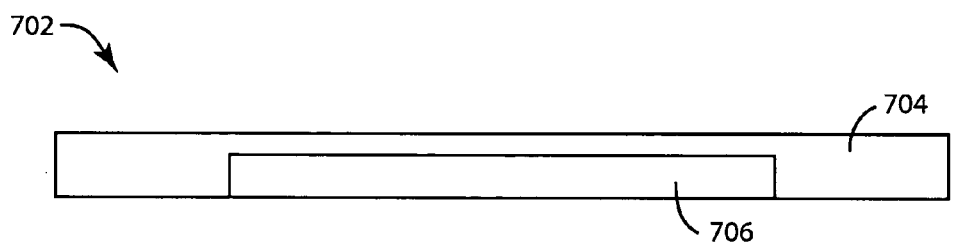
FIG. 7 is a schematic illustration of an article of the invention used as a lattice for incorporation into a composite matrix for use as, e.g., a dielectric layer.
Figure 7:
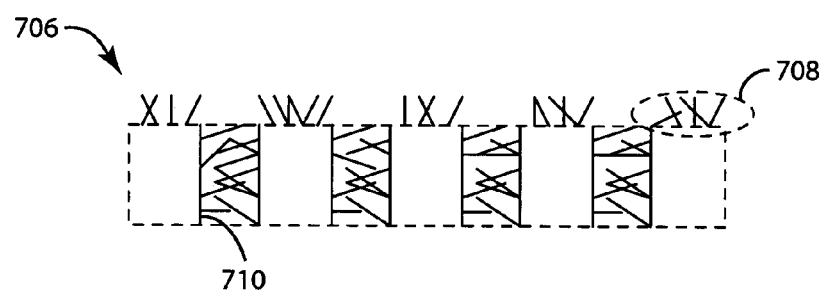

FIG. 7 schematically illustrates a composite matrix incorporating the materials of the invention. As shown, a film of composite material 702 includes within a matrix material, e.g., a polymer, ceramic, glass or the like, a porous substrate 706 that includes nanofibers 708 disposed upon its surface 710, including within pores or apertures 710. The porous substrate is generally immersed or impregnated with the matrix material to provide film 702. As noted above, these composite films are then applied in a variety of applications, e.g., as conductive films, dielectric films, etc.

Figure 8:
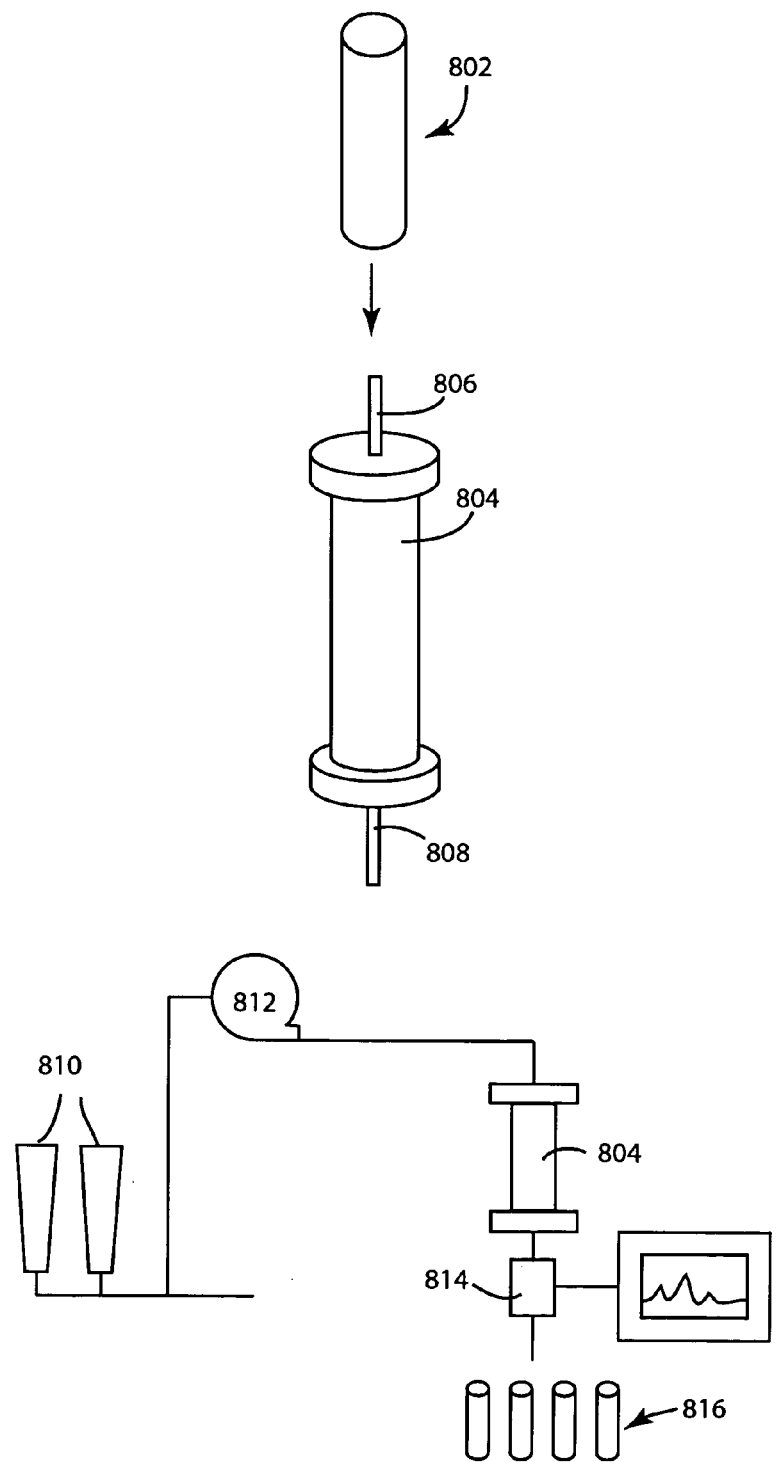
FIG. 8 is a schematic illustration of separation media incorporating the substrates of the invention in conjunction with column apparatus for performing chromatographic separations.

FIGS. 8A and 8B schematically illustrate the use of porous substrates to provide high surface area matrices for separation applications, e.g., chromatography. In particular, as shown in FIG. 8A, a porous substrate 802 that has nanofibers attached to its surface is provided. As noted, this porous substrate may be provided in a number of different forms. For example, substrate 802 may comprise a mesh or screen that is rolled into a cylinder, either before or after the fibers are attached or grown upon it. Alternatively, the substrate may comprise a solid, but sintered or fritted material, e.g., metal or glass. In still other aspects, the substrate may comprise a fibrous material, e.g., glass wool, woven fabric etc., that is shaped into the desired shape, e.g., a cylinder 802 as shown, either by forming the material as such or packing the material into a cylindrical (or other shaped) housing. Again, such shaping may take place either before or after the nanofibers have been grown or otherwise attached to the surface of the porous material.

The substrate 802 is then placed into a column 804, which includes an inlet 806 and an outlet 808 through which fluids are flowed into and out of the column during a separation operation. As shown in FIG. 8B the column 804 is then connected to appropriate liquid handling equipment, e.g., gradient makers 810, pumps 812, detectors 814, fraction collectors 816, and the like, for carrying out chromatographic separations.

As will be apparent, the separation matrices incorporating the substrate materials of the invention may encompass any of a variety of the different substrate structures and conformations, employ any number of a variety of different types of nanofibers, as described elsewhere herein. Such structures, conformations and compositions are generally selected depending upon the particular application to which they are to be put and which will generally be appreciated by those of ordinary skill in the art.

D. Reinforcing Lattice for Composite Materials

In still another aspect of the invention, the porous, nanofiber bearing substrates of the invention form the lattice of a composite material to enhance the integration of the lattice and improve the structural characteristics of the overall composite material. In particular, a number of composite materials include a lattice that provides the underlying structural integrity that supports an additional material, e.g., epoxies or other polymers, ceramics, glasses, etc. For example, composites of fiberglass cloth encased in epoxy resins, or other polymers are routinely used in a variety of different applications, including, e.g., furniture, surfboards and other sporting goods, auto body repairs, and the like. Likewise, carbon fiber cloths or substrates are also generally encased in a polymer or epoxy resin before they are formed into the desired shape. Ultimately, these composite materials generally possess structural characteristics, e.g., strength to weight ratios, that are better than most other materials. Without being bound to a particular theory of operation, it is believed that the interaction of the encasing material and the lattice material is of significant importance in these structural characteristics. Specifically, it is believed that by enhancing the interaction of the two components of the composite, e.g., improving integration of one into the other, will improve the strength of the ultimate composite material. Because the nanofiber bearing porous substrates of the invention benefit from extremely high surface areas, as compared to that of the porous substrate alone, it is expected that they will possess substantially greater interactivity with the surrounding encasing material, e.g., the epoxy. As such, another aspect of the invention includes the use of the porous substrates having nanofibers deposited thereon, as a lattice material for a composite material.

Figure 11:
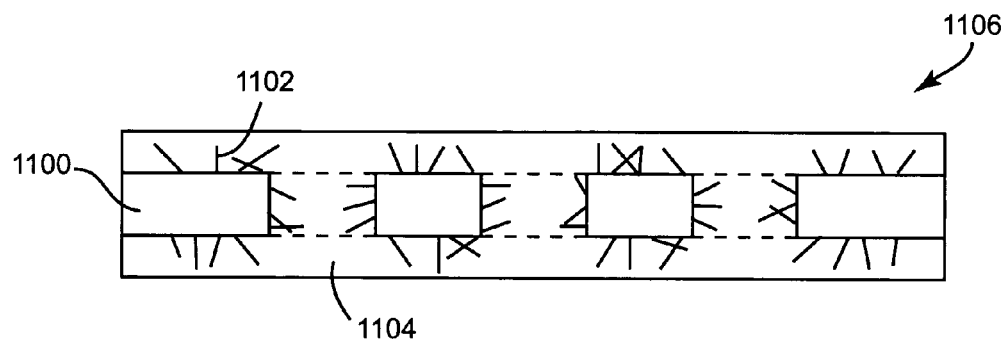
FIG. 11 illustrates a composite material that employs the porous substrates of the invention disposed within a matrix material.

A general illustration of this aspect of the invention is shown in FIG. 11. As shown, a porous substrate 1100 having a surface that includes nanofibers 1102, is immersed within a matrix material, e.g., hardened polymer 1104 to provide a composite material 1106, that may be fabricated into a variety of different materials or articles of manufacture.

As noted, a variety of fabrics are generally incorporated into composite matrices as a supporting lattice for the ultimate material. For example, carbon fiber composites typically employ a woven carbon fiber material which is then intercalated with a resin, e.g., an epoxy or other polymeric material. The composite material is then formed into a desired shape and allowed to cure. Alternatively, the desired shape may be formed post curing, e.g., by sanding or otherwise sculpting the hardened material. Similarly, woven glass fabrics are used in fiberglass composite materials by intercalating the fabric with an appropriate matrix, e.g., an epoxy, etc.

In the context of the present invention, a porous substrate that has nanofibers deposited upon it or attached to its surface(s) is used as the lattice material for the resultant composite. The nanofiber material is intercalated with a matrix material that substantially or at least partially fills the voids within the material. Because of the extremely high surface area, the matrix binds to and integrates the lattice material extremely well, resulting in a stronger composite material than those based simply on a porous substrate alone, e.g., in the absence of the nanofiber surfaces. Such composite materials may be generally employed in a number of applications where high strength to weight ratios are desired, such as in lightweight engineered parts, e.g., bicycles, tennis rackets, automotive parts, aviation parts, satellite and other extraterrestrial equipment and parts, etc.

While virtually any porous substrate material, e.g., as described elsewhere herein, may be employed as the supporting lattice, for a number of applications, a flexible lattice material is more desirable, as it may be later conformed to a desired shape, e.g., molded or sculpted, for a particular application. In at least a first preferred aspect, flexible mesh materials are used as the supporting lattice. Such materials include porous polymeric sheets, porous metal sheets, flexible porous glass sheets, e.g., sintered glass sheets, and the like. In other preferred aspects, porous woven cloth-like materials are employed as the lattice, including, e.g., woven polymeric fabrics, (i.e., polyesters, nylons, polyetherketones, polyaramid, etc.), woven glass fabrics (i.e., fiberglass fabrics, glass wool, etc), carbon or graphite fiber fabrics, Kevlar fabrics, and metallic fiber fabrics (e.g., titanium, stainless steel, nickel, platinum, gold, etc.). The wide range of different porous, flexible substrates for use as the lattice material will generally be appreciated by those of ordinary skill in the art, and may generally be varied to accomplish the needs of the ultimate application, e.g., light weight and/or enhanced strength, materials compatibility, and the like.

Like the lattice material, the type of material used as the intercalating matrix for the lattice will generally depend upon the nature of the application to which the material is to be put. By way of example, inorganic materials may be employed as the matrix, including glass, ceramics or the like. Alternatively, and preferably, polymeric matrices are employed, including thermosets, such as polyester, epoxy, urethane and acrylate resins, and the like, thermoplastics and/or thermoplastic elastomers, such as polyethylene, polypropylene, nylon, PFA, and the like. Typically any of these matrix materials may be deposited as a polymer over the lattice substrate and allowed to intercalate throughout the nanofiber mesh. Subsequently, the matrix material is allowed to or caused to cure in situ. Alternatively, polymeric matrices may be intercalated as a monomeric solution and polymerized in situ to "cure" the matrix in place. In still further alternate aspects, the polymeric matrix may be deposited over the porous substrate bearing the nanofibers, using a vapor phase or solvent deposition process, e.g., as described above for the cross-linking of nanofibrous mats. The full range of different polymers and their utility in a wide range of different applications will be readily apparent to those of ordinary skill in the art.

All publications and patent applications are herein incorporated by reference to the same extent as if each individual publication or patent application was specifically and individually indicated to be incorporated by reference. Although the present invention has been described in some detail by way of illustration and example for purposes of clarity and understanding, it will be apparent that certain changes and modifications may be practiced within the scope of the appended claims.

What is claimed is:

1. A bandage, comprising:
   a flexible porous substrate having a plurality of apertures disposed therethrough, the porous substrate having an overall surface that includes an interior wall surface of the apertures and an exterior surface of the substrate; and
   a plurality of nanofibers deposited upon or attached to at least a portion of the overall surface of the porous substrate, wherein at least a portion of the nanofibers are attached to or deposited upon the exterior surface of the substrate and at least a portion of the nanofibers are attached to the interior wall surface area of the plurality of apertures, whereby when the bandage is applied to a wound, the nanofibers attached to the exterior surface of the substrate provide adhesion to surface tissues adjacent to the wound or to an opposing side of the substrate.

2. The bandage of claim 1, comprising a protective pad disposed upon a first portion of a first side of the substrate, whereby when the bandage is applied to a wound, the protective pad overlays the wound.

3. The bandage of claim 1, wherein the nanofibers are functionalized with a hydrophobic chemical moiety, and wherein the nanofibers and aperture together define a pore which is permeable to gas and not permeable to water.

4. The bandage of claim 1, wherein the nanofibers are grown in situ on the substrate material.

5. The bandage of claim 1, wherein at least a portion of the nanofibers are oriented in a direction extending away from the surface of the substrate at the point of attachment between the nanofibers and the substrate.

6. The bandage of claim 1, wherein the nanofibers comprise an inorganic semiconductor, an inorganic semiconductor oxide, a ceramic, or a biologically derived compound, or are carbon nanotubes.

7. The bandage of claim 1, wherein the nanofibers comprise silicon.

8. The bandage of claim 1, wherein the nanofibers comprise an antimicrobial material.

9. The bandage of claim 1, wherein the nanofibers comprise $TiO_2$.

10. The bandage of claim 1, wherein the substrate comprises a woven fabric.

11. The bandage of claim 1, wherein the substrate comprises a mesh.

12. The bandage of claim 2, wherein the mesh comprises a polymer mesh.

13. The bandage of claim 1, wherein a substantial portion of the nanowires are attached to the interior walls of the substrate.

14. The bandage of claim 1, wherein the nanofibers are primarily attached to the interior wall surface area of the plurality of apertures.

15. The bandage of claim 1, wherein the nanofibers attached to the interior wall surface area of the plurality of apertures have a total volume which is substantially smaller than the volume of said apertures.

16. The bandage of claim 1, wherein the nanofibers attached to the substrate only slightly narrow the apertures of the substrate.

17. The bandage of claim 1, further comprising a second substrate having a plurality of apertures disposed therethrough.

* * * * *